(12) United States Patent
Ma et al.

(10) Patent No.: US 12,250,360 B2
(45) Date of Patent: Mar. 11, 2025

(54) DISPLAY APPARATUS WITH LIGHT-SPLITTING COMPONENT AND DRIVING METHOD THEREOF

(71) Applicant: BOE Technology Group Co., Ltd., Beijing (CN)

(72) Inventors: Sen Ma, Beijing (CN); Xue Dong, Beijing (CN); Jian Gao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 183 days.

(21) Appl. No.: 17/757,975

(22) PCT Filed: Jan. 25, 2021

(86) PCT No.: PCT/CN2021/073653
§ 371 (c)(1),
(2) Date: Jun. 24, 2022

(87) PCT Pub. No.: WO2022/155969
PCT Pub. Date: Jul. 28, 2022

(65) Prior Publication Data
US 2023/0164302 A1 May 25, 2023

(51) Int. Cl.
*G09G 1/06* (2006.01)
*G09G 3/34* (2006.01)
*H04N 13/305* (2018.01)

(52) U.S. Cl.
CPC ........... *H04N 13/305* (2018.05); *G09G 3/342* (2013.01); *G09G 2300/0452* (2013.01)

(58) Field of Classification Search
CPC .................. H04N 13/305; G09G 3/342; G09G 2300/0452
See application file for complete search history.

(56) References Cited

U.S. PATENT DOCUMENTS 6,801,243 B1 10/2004 Van Berkel
2010/0097449 A1* 4/2010 Jeong .................... H04N 13/32
348/E13.001

(Continued)

FOREIGN PATENT DOCUMENTS

EP 0752609 A2 1/1997
EP 0829743 A2 3/1998
EP 3499578 A1 6/2019

OTHER PUBLICATIONS

European Extended Search Report, mailed May 19, 2023, from EP App. 21920361.9, 9 pages.

(Continued)

*Primary Examiner* — Sanghyuk Park
(74) *Attorney, Agent, or Firm* — Workman Nydegger

(57) ABSTRACT

The present disclosure provides a display apparatus and a driving method thereof. The display apparatus includes a display panel including a plurality of pixel islands arranged at intervals in a row direction and a column direction, each pixel island being provided with a plurality of sub-pixels arranged at intervals in the row direction; and a light splitting component, disposed on a display side of the display panel and including a plurality of light splitting structures extending in the column direction and continuously arranged in the row direction. In the row direction, every at least two adjacent light splitting structures are one light splitting repeating unit. Each light splitting repeating unit covers one column of the pixel islands correspondingly. In one of the pixel islands, relative positions of all sub-pixels to the corresponding light splitting structures are complementary.

20 Claims, 20 Drawing Sheets

(56) References Cited

U.S. PATENT DOCUMENTS

| | | | |
|---|---|---|---|
| 2013/0069918 A1* | 3/2013 | Hou .................. | G02F 1/134336 |
| | | | 345/204 |
| 2013/0208357 A1* | 8/2013 | Saito ...................... | G02B 30/27 |
| | | | 359/463 |
| 2016/0249042 A1 | 8/2016 | Liao | |
| 2017/0195657 A1 | 7/2017 | Li et al. | |
| 2020/0043989 A1 | 2/2020 | Liu et al. | |
| 2020/0174279 A1 | 6/2020 | Ishihara et al. | |
| 2022/0103804 A1* | 3/2022 | Naske .................... | G02B 30/27 |
| 2022/0206313 A1 | 6/2022 | Park et al. | |

OTHER PUBLICATIONS

Swash, M.R. et al., "Distributed pixel mapping for refining dark area in parallax barriers based on holoscopic 3D Display", 2013 International Conference on 3D Imaging, IEEE, Dec. 3, 2013, pp. 1-4.

U.S. Non-Final Office Action, mailed Dec. 7, 2023, from U.S. Appl. No. 18/316,915, 17 pages.

U.S. Non-Final Office Action, mailed Sep. 29, 2024, from U.S. Appl. No. 18/394,220, 21 pages.

* cited by examiner

-- Prior Art --

DISPLAY APPARATUS WITH LIGHT-SPLITTING COMPONENT AND DRIVING METHOD THEREOF

CROSS REFERENCE TO RELATED APPLICATIONS

The present application is a national phase entry under 35 U.S.C. § 371 of International Application No. PCT/CN2021/073653, filed on Jan. 25, 2021.

FIELD

The present disclosure relates to the technical field of display, in particular to a display apparatus and a driving method thereof.

BACKGROUND

With constant development of display technology, a three-dimensional (3D) display technology has attracted more and more attention. Through the three-dimensional display technology, a display picture becomes three-dimensional and realistic. A principle of the technology is that: a left eye image and a right eye image with a certain parallax are respectively received by left and right eyes of a person, and after the two parallax images are received by the left and right eyes of the person, the brain can superimpose and fuse image information to construct a 3D visual display effect.

SUMMARY

In one aspect, embodiments of the present disclosure provide a display apparatus, including:
  a display panel, including: a plurality of pixel islands arranged at intervals in a row direction and a column direction, each pixel island being provided with a plurality of sub-pixels arranged at intervals in the row direction; and
  a light splitting component, disposed on a display side of the display panel and including a plurality of light splitting structures extending in the column direction and continuously arranged in the row direction.

In the row direction, every at least two adjacent light splitting structures are one light splitting repeating unit, each light splitting repeating unit covers one column of the pixel islands correspondingly, and in one of the pixel islands, relative positions of all sub-pixels to the corresponding light splitting structures are complementary.

Optionally, in the above display apparatus provided by the embodiments of the present disclosure, in one of the pixel islands, the relative positions of all the sub-pixels to the corresponding light splitting structures are continuously arranged on the row direction.

Optionally, in the above display apparatus provided by the embodiments of the present disclosure, in a horizontal direction, a width of the light splitting structure is equal to 1/m of a width of the corresponding pixel island, m is a total quantity of the light splitting structures in one of the light splitting repeating units.

Optionally, in the above display apparatus provided by the embodiments of the present disclosure, the pixel island includes m*N+k sub-pixels, N is an integer larger than or equal to 2, k is an integer larger than or equal to 1, and no common divisor of k and m exits other than 1.

In the row direction, a ratio of a width of the sub-pixel to a width of a gap between two adjacent sub-pixels is larger than or equal to $0.95/(m-1)$ and smaller than or equal to $1.05/(m-1)$.

Optionally, in the above display apparatus provided by the embodiments of the present disclosure, in a direction perpendicular to the display panel, a perpendicular distance T between the pixel island and the light splitting structure satisfies the following formula:

$$0.95 * \frac{W}{2} * \text{Cot}\frac{(m*N+k)*\Delta\theta}{2} \leq T \leq 1.05 * \frac{W}{2} * \text{Cot}\frac{(m*N+k)*\Delta\theta}{2},$$

w is a width of one of the light splitting structures in the row direction, $\Delta\theta$ is an angle of a viewpoint formed by light emitted by one of the sub-pixels passing the corresponding light splitting structure.

Optionally, in the above display apparatus provided by the embodiments of the present disclosure, an angle of a gap between two adjacent viewpoints is $\Delta\theta$.

Optionally, in the above display apparatus provided by the embodiments of the present disclosure, the light splitting structure is a cylindrical lens, and a focal length of the cylindrical lens is equal to T.

Optionally, in the above display apparatus provided by the embodiments of the present disclosure further includes: a spacer dielectric layer located between the display panel and the light splitting structure.

Optionally, in the above display apparatus provided by the embodiments of the present disclosure, m is 2, N is 4, and k is 1; or, m is 3, N is 2, and k is 2; or, m is 3, N is 3, and k is 1; or, m is 3, N is 3, and k is 2; or, m is 4, N is 2, and k is 1; or, m is 4, N is 2, and k is 3; or, m is 5, N is 2, and k is 1; or, m is 5, N is 2, and k is 2; or, m is 5, N is 2, and k is 3; or, m is 5, N is 2, and k is 4; or, m is 6, N is 2, and k is 1; or, m is 6, N is 2, and k is 5.

Optionally, in the above display apparatus provided by the embodiments of the present disclosure, each light splitting structure is configured to enable light emitted by all sub-pixels covered thereby to form a main lobe viewing angle, and enable light emitted by all sub-pixels covered by adjacent light splitting structure(s) to form side lobe viewing angle(s).

A shortest distance between a boundary of the main lobe viewing angle and a boundary of the side lobe viewing angle is equal to a width of the light splitting structure in the row direction, and a shortest distance between boundaries of any two adjacent side lobe viewing angles is equal to the width of the light splitting structure in the row direction.

Optionally, in the above display apparatus provided by the embodiments of the present disclosure, every three of the pixel islands continuously arranged in the row direction are one pixel repeating unit.

In one of pixel repeating units, the sub-pixels of the same pixel island are the same in display color, and the sub-pixels of different pixel islands are different in the display color.

In another aspect, embodiments of the present disclosure provides a method for driving the above display apparatus, including:
  determining a first image driving signal corresponding to each pixel island under a two-dimensional display mode according to image information to be displayed, and loading the corresponding first image driving signal to all sub-pixels in the pixel island to form a two-dimensional image; and determining a second image driving signal corresponding to each viewpoint under a three-dimensional display mode according to the image information to be displayed, and applying the second image driving signal corresponding to the same viewpoint to sub-pixels located at the same position in different pixel islands to form a three-dimensional image with a plurality of viewpoints.

DETAILED DESCRIPTION OF THE EMBODIMENTS

Figure 1:
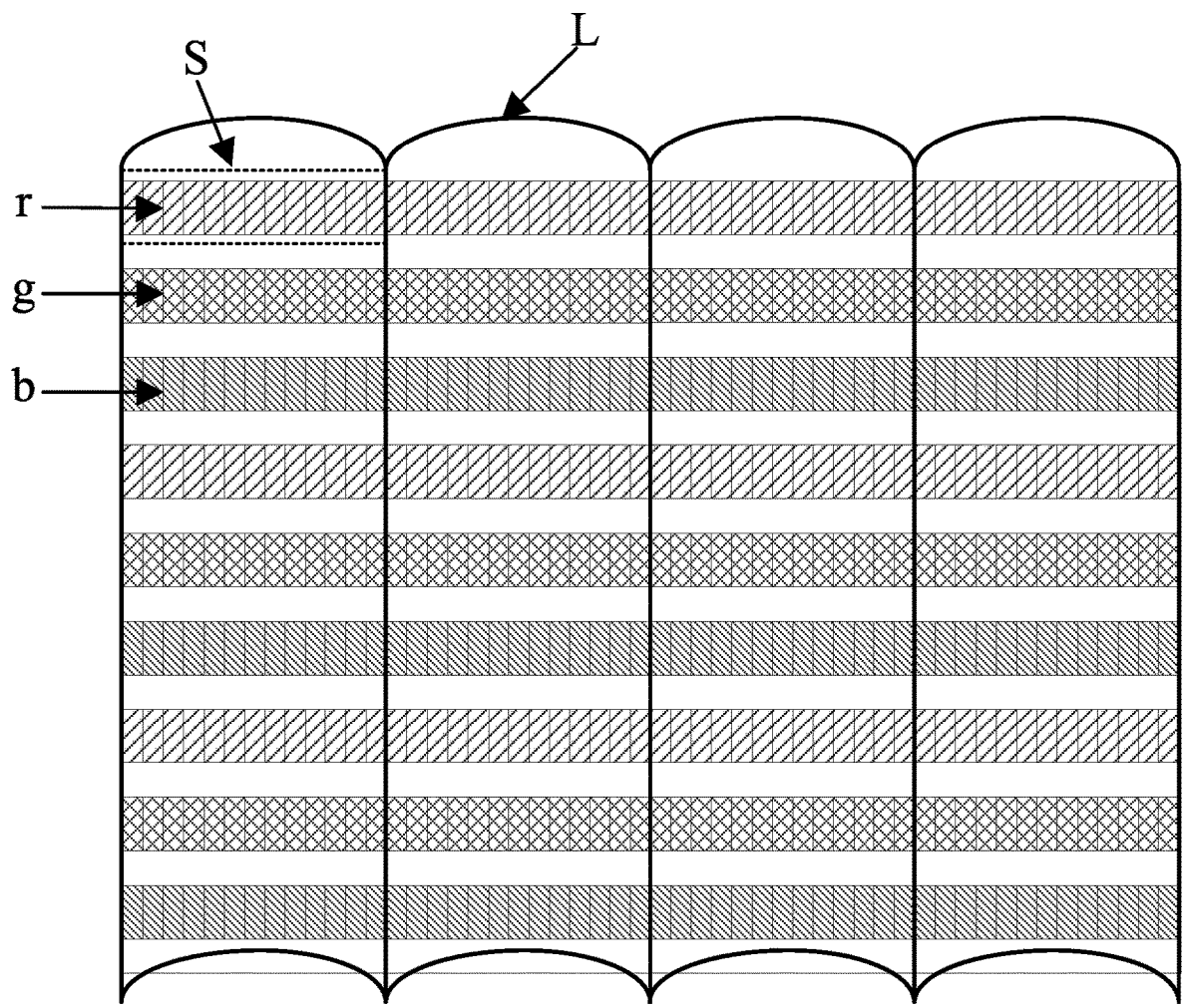
FIG. 1 is a schematic structural diagram of a display apparatus in the related art.

In order to make objectives, technical solutions and advantages of embodiments of the present disclosure clearer, the technical solutions of the embodiments of the present disclosure will be clearly and completely described below in combination with the accompanying drawings of the embodiments of the present disclosure. It should be noted that the sizes and shapes of the figures in the accompanying drawings do not reflect the actual scale, and are only intended to illustrate the present disclosure. The same or similar reference numerals refer to the same or similar elements or elements having the same or similar functions throughout. Apparently, the described embodiments are only some embodiments of the present disclosure, rather than all the embodiments. Based on the embodiments of the present disclosure, all other embodiments obtained by those of ordinary skill in the art without creative efforts fall within the protection scope of the present disclosure.

Unless otherwise defined, technical or scientific terms used herein shall have the ordinary meaning as understood by those of ordinary skill in the art to which the present disclosure belongs. Similar words such as "first" or "second" used in the specification and the claims of the present disclosure do not denote any order, quantity, or importance, but are merely used to distinguish the various components. Similar words such as "comprise" or "include" mean that elements or items appearing before the words encompass elements or items recited after the words and their equivalents, but do not exclude other elements or items. "Inner", "outer", "upper", "lower", etc. are only used to indicate a relative positional relationship, and when an absolute position of a described object changes, the relative positional relationship may also change accordingly.

Figure 2:
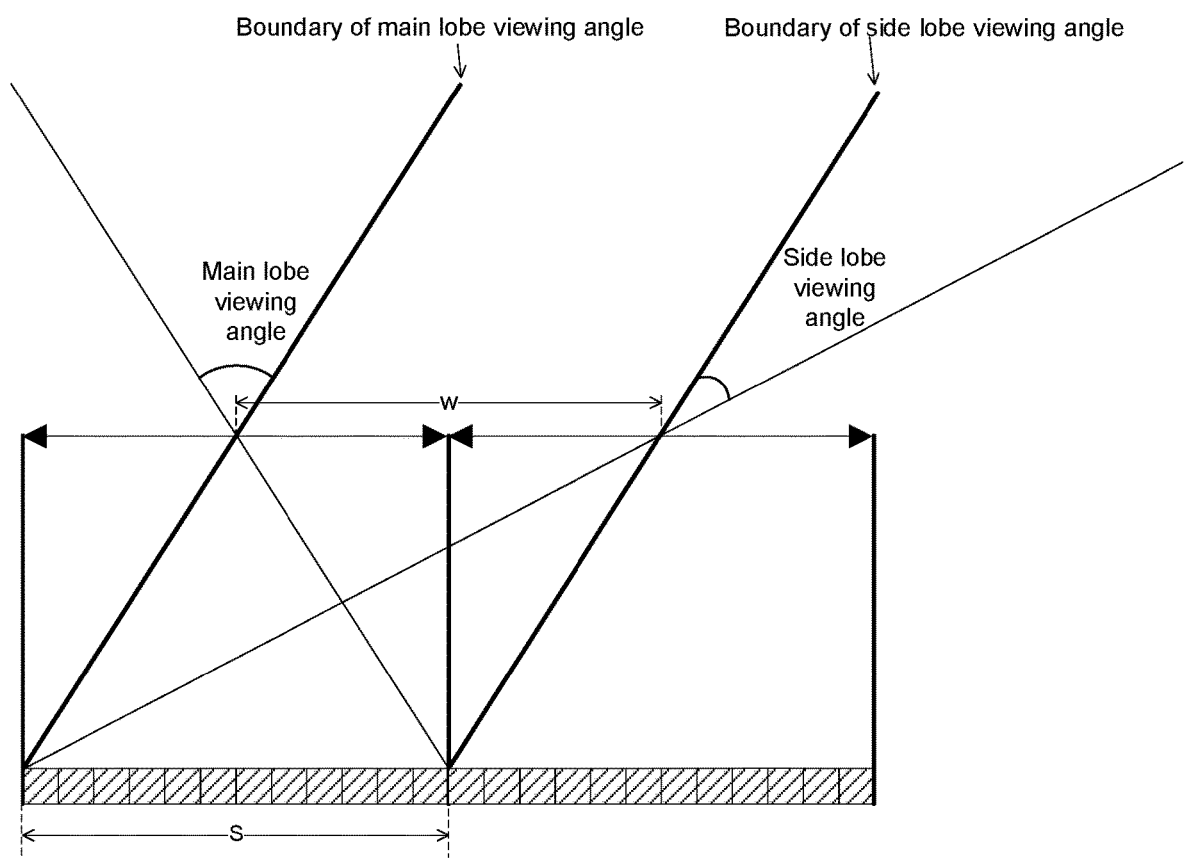
FIG. 2 is a schematic diagram of a light path of light emitted by a pixel island passing a light splitting structure in the related art.

FIG. 1 shows a display apparatus in the related art. The display apparatus includes a plurality of pixel islands S. Each pixel island S may be divided into a plurality of sub-pixels. Each sub-pixel can be controlled independently. No gap exists between the sub-pixels. Further, as shown in FIG. 2, a main lobe viewing angle and a side lobe viewing angle of an entire pixel island S are closely connected, and continuous light emission can be realized.

However, due to limitation of process capability, the sub-pixels in the pixel island S are not continuously arranged, i.e. gaps exist among the sub-pixels in the pixel island S, so the pixel island S cannot realize continuous light emission, resulting in non-continuous viewing angles. Therefore, a "black region" will be seen at a corresponding position where a gap is projected to a space, which affects a viewing effect.

Figure 3:
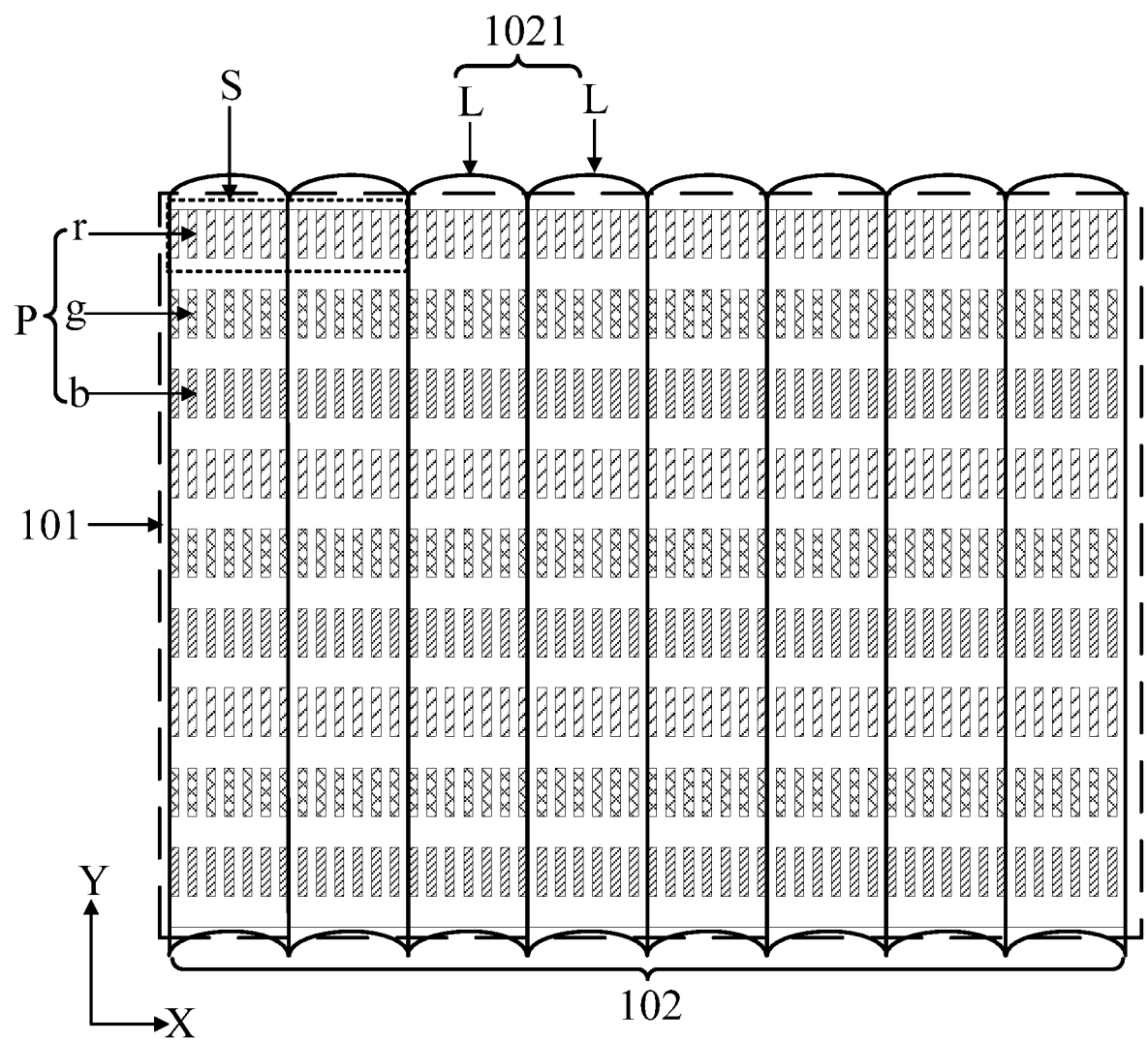
FIG. 3 is a schematic structural diagram of a display apparatus provided by an embodiment of the present disclosure.

For the above technical problem existing in the related art, embodiments of the present disclosure provide a display apparatus, as shown in FIG. 3, including:

a display panel 101, including: a plurality of pixel islands S arranged at intervals in a row direction X and a column direction Y; each pixel island S being provided with a plurality of sub-pixels arranged at intervals in the row direction X; and a light splitting component 102, disposed on a display side of the display panel 101 and including a plurality of light splitting structures L extending in the column direction Y and continuously arranged in the row direction X.

In the row direction X, every at least two adjacent light splitting structures L are one light splitting repeating unit 1021. Each light splitting repeating unit 1021 covers one column of the pixel islands S correspondingly. In one of the pixel islands S, relative positions of the sub-pixels to the corresponding light splitting structures L are complementary.

In the above display apparatus provided by the embodiments of the present disclosure, because each pixel island S is covered with a plurality of light splitting structures L. The relative positions of the sub-pixels to the corresponding light splitting structures L above the sub-pixels just form a staggered complementary arrangement mode. The light splitting structure L is relatively small in pitch, it is impossible for the human eyes to distinguish which light splitting structure L specifically emits the light, so it appears to the human eye that emergent light of the pixel island S being split through the plurality of light splitting structures L above it is continuous in space and the human eyes will not see a "black region" in case of spatial movement.

For better understanding of the solution, taking FIG. 4 as an example below, it will be described in detail that the emergent light of the pixel island S passing the plurality of light splitting structures L above it is continuous in space.

First, continuity of a main lobe viewing angle is described. The main lobe viewing angle refers to a viewing angle formed in space by light emitted by the sub-pixels passing the light splitting structures L right above them to be split.

Figure 4:
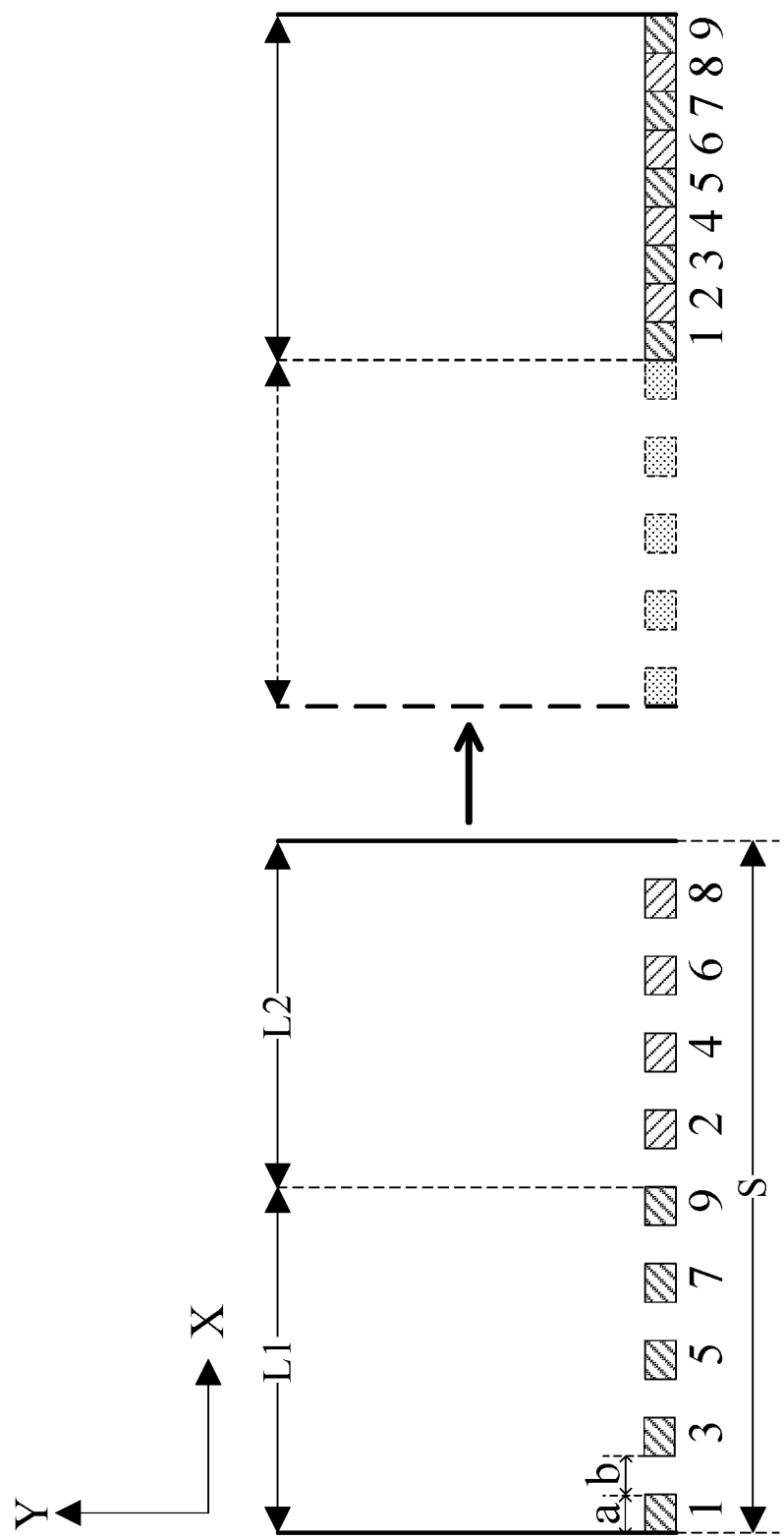
FIG. 4 is a diagram of complementary arrangement of relative positions of sub-pixels in a pixel island and a corresponding light splitting structure provided by an embodiment of the present disclosure.

It can be seen from FIG. 4 that, one pixel island S includes nine sub-pixels, respectively marked as a first sub-pixel 1, a second sub-pixel 2, a third sub-pixel 3, a fourth sub-pixel 4, a fifth sub-pixel 5, a sixth sub-pixel 6, a seventh sub-pixel 7, an eighth sub-pixel 8 and a ninth sub-pixel 9. One light splitting repeating unit 1021 corresponding to the pixel island S includes two light splitting structures L, respectively marked as a first light splitting structure L1 and a second light splitting structure L2. The first light splitting structure L1 covers the first sub-pixel 1, the third sub-pixel 3, the fifth sub-pixel 5, the seventh sub-pixel 7 and the ninth sub-pixel 9, and the second light splitting structure L2 covers the second sub-pixel 2, the fourth sub-pixel 4, the sixth sub-pixel 6 and the eighth sub-pixel 8. It can be seen from FIG. 4 that the relative positions of the first sub-pixel 1, the third sub-pixel 3, the fifth sub-pixel 5, the seventh sub-pixel 7 and the ninth sub-pixel 9 to the first light splitting structure L1 are exactly located in gaps among the relative positions of the second sub-pixel 2, the fourth sub-pixel 4, the sixth sub-pixel 6 and the eighth sub-pixel 8 to the second light splitting structure L2, thus forming a staggered complementary arrangement mode.

Figure 5:
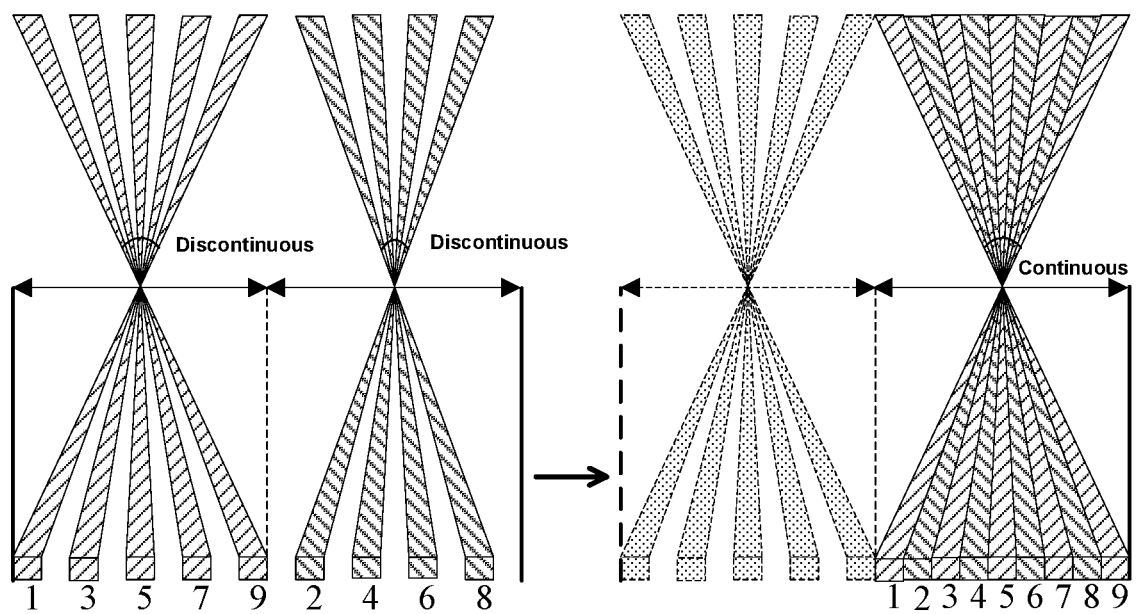
FIG. 5 is a schematic diagram of continuous light emission of a main lobe viewing angle of the pixel island shown in FIG. 4.

Light emission distribution after light emitted by each of the first sub-pixel 1, the third sub-pixel 3, the fifth sub-pixel 5, the seventh sub-pixel 7 and the ninth sub-pixel 9 is split by the first light splitting structure L1 directly above them and the light output distribution after light emitted by the second sub-pixel 2, the fourth sub-pixel 4, the sixth sub-pixel 6 and the eighth sub-pixel 8 is split by the second light splitting structure L2 directly above them are as shown in FIG. 5. Since there are gaps between the first sub-pixel 1 to the ninth sub-pixel 9, the light emitted by adjacent sub-pixels after passing through the same light splitting structure L is discontinuous in space. Relative positions of sub-pixels in the same pixel island S to the two light splitting structures L are in a staggered complementary relationship, so light emitting angles of the two light splitting structures L are also complementary in a staggered mode. Due to small pitch of the light splitting structure L, it is impossible for the human eyes to distinguish which light splitting structure L specifically emits the light. Therefore, it appears to the human eye that the emergent light of each pixel island S being split by the plurality of light splitting structures L above it is continuous in space and the human eyes will not see a "black region" in case of spatial movement.

Figure 6:
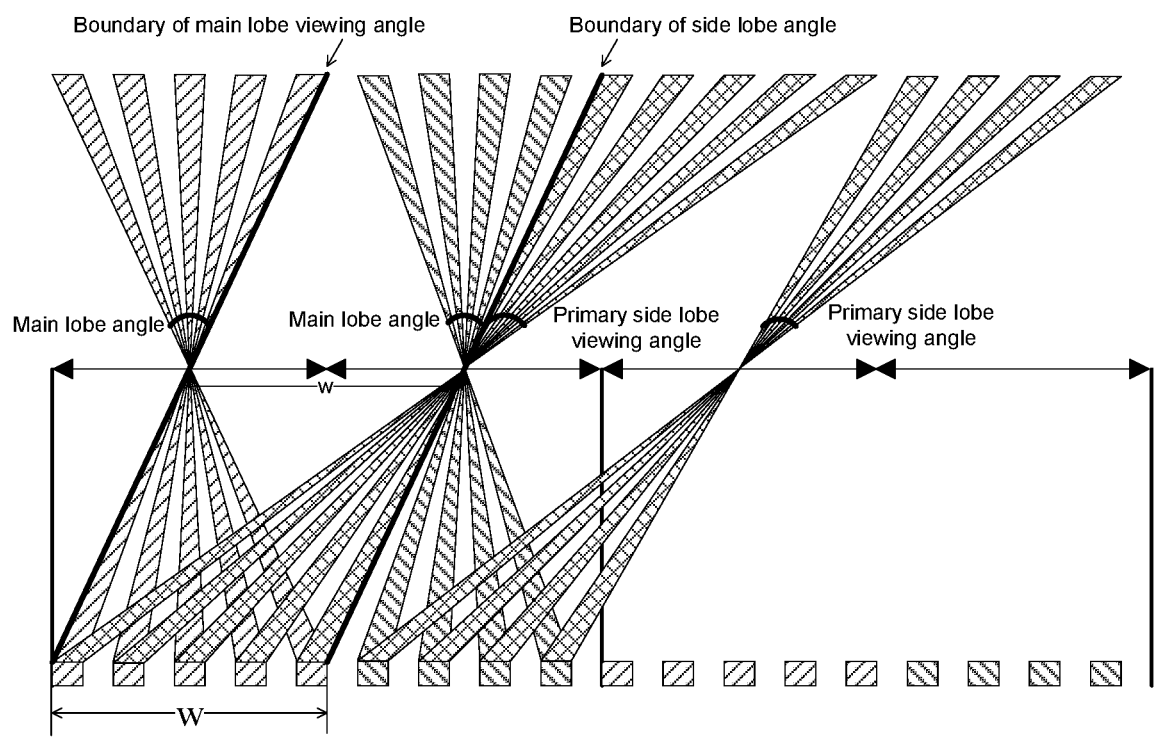
FIG. 6 is a schematic diagram of continuous light emission of a main lobe viewing angle and a side lobe viewing angle of the pixel island shown in FIG. 4.

Then, continuity of the main lobe viewing angle and the side lobe viewing angle is described. The side lobe viewing angle refers to a viewing angle formed in space by light emitted by the sub-pixels passing the light splitting structures L adjacent to the light splitting structure L right above them. For example a viewing angle formed by light passing a first light splitting structure L (such as the second light splitting structure L2) adjacent to the light splitting structure L right above (such as the first light splitting structure L1) is a primary side lobe viewing angle, and a viewing angle formed by light passing a second light splitting structure L adjacent to the light splitting structure L right above is a secondary side lobe viewing angle, etc. Similar to the above-mentioned continuity of the main lobe viewing angle, two discontinuous primary side lobe viewing angles of the pixel island S passing the adjacent light splitting structures L may be complementary to be one continuous primary side lobe viewing angle. Pitches of the first light splitting structure L1 and the second light splitting structure L2 each is equal to ½ of a pitch of the pixel island S, so a boundary of the main lobe viewing angle and a boundary of the side lobe viewing angle are definitely parallel, and a distance between the two boundaries is equal to the pitch of the pixel island S, as shown in FIG. 6. Since the human eyes cannot distinguish a distance between the boundary of the main lobe viewing angle and the boundary of the side lobe viewing angle, it is observed that the main lobe viewing angle and the side lobe viewing angle are also continuous. In the same way, the primary side lobe viewing angle and the secondary side lobe viewing angle are also continuous, the secondary side lobe viewing angle and a tertiary side lobe viewing angle are also continuous, and so on. In this way, a continuous viewing angle is obtained. In theory, the viewing angle of the pixel island S can reach 180°.

It can be seen from the above description that, in the above display apparatus provided by the embodiments of the present disclosure, each light splitting structure L is configured to enable light emitted by all sub-pixels covered by the light splitting structure L to form the main lobe viewing angle, and enable light emitted by all sub-pixels covered by an adjacent light splitting structure L to form the side lobe viewing angle. The shortest distance between the boundary of the main lobe viewing angle and the boundary of the side lobe viewing angle is equal to the width of the light splitting structure L in the row direction X, and the shortest distance between boundaries of any two adjacent side lobe viewing angles is equal to the width of the light splitting structure L in the row direction X.

In addition, because sub-pixel sub-division is performed in the pixel island S (which may server as a sub pixel in 2D display), a same resolution as 2D display may be maintained under a 3D display mode, and multi-viewpoint display of a large viewing angle can be realized in combination of eye-tracking. Further, compared with other solutions in the related art that 3D display is performed by taking sub pixel as a unit, the above solution can realize 3D display of more pixels per inch (ppi), a larger amount of information and lower color interference between adjacent viewpoints.

Figure 7:
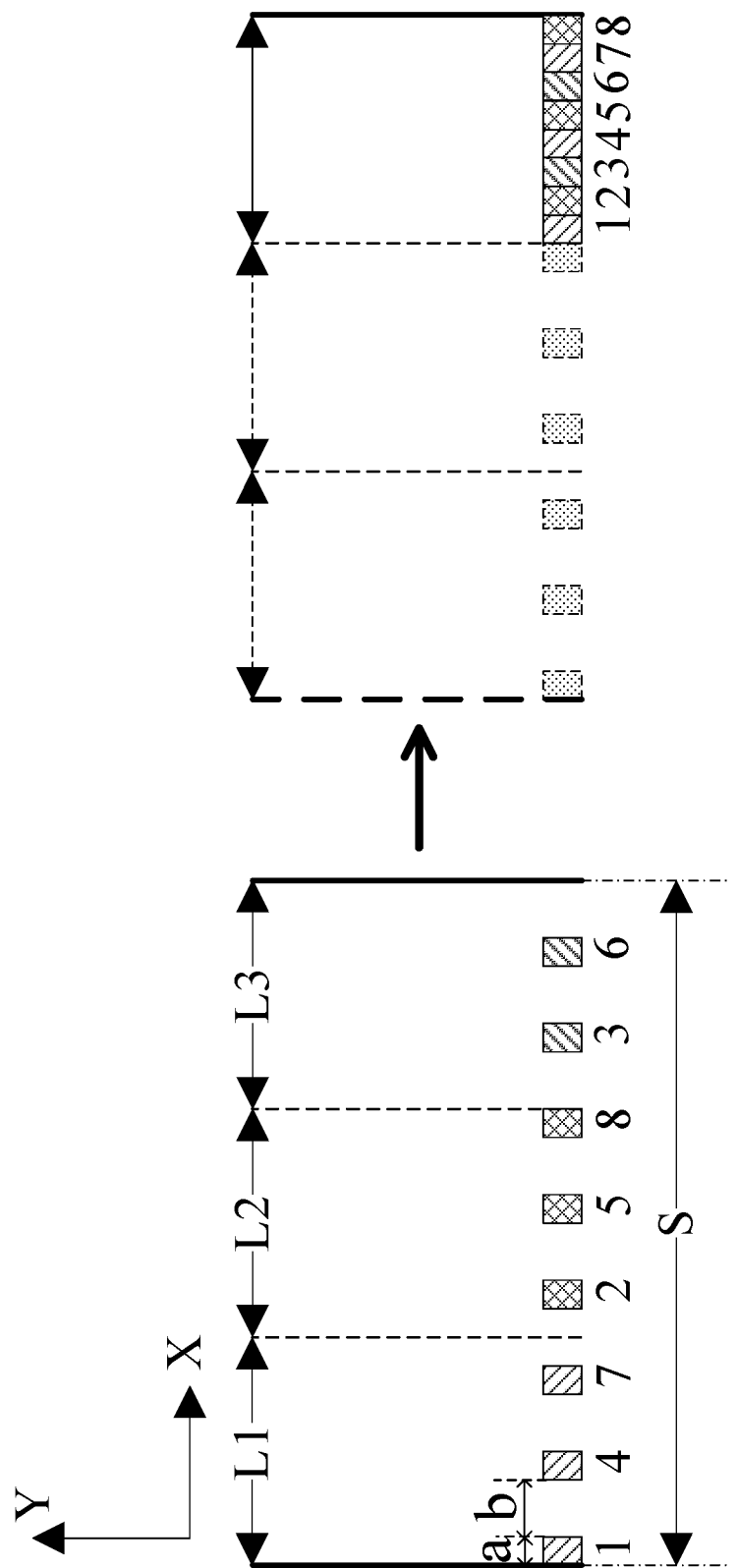
FIG. 7 is another diagram of complementary arrangement of relative positions of sub-pixels in a pixel island and a corresponding light splitting structure provided by an embodiment of the present disclosure.

Optionally, in the above display apparatus provided by the embodiments of the present disclosure, as shown in FIG. 4 and FIG. 7, in one pixel island S, the relative positions of all the sub-pixels to the corresponding light splitting structures L are continuously arranged in the row direction X, so that emergent light emitted by the sub-pixels in the pixel island S is continuous in space after passing the corresponding light splitting structures L.

Optionally, in the above display apparatus provided by the embodiments of the present disclosure, in a horizontal direction X, a width of the light splitting structure L is equal to 1/m of a width of the corresponding pixel island S. m is a total quantity of the light splitting structures L in one of the light splitting repeating units 201. For example, in FIG. 4, a light splitting repeating unit 201 has two light splitting structures L, namely a first light splitting structure L1 and a second light splitting structure L2, and the widths of the first light splitting structure L1 and the second light splitting structure L2 each is equal to ½ of the width of the pixel island S. In FIG. 7, a light splitting repeating unit 201 has three light splitting structures L, namely a first light splitting structure L1, a second light splitting structure L2 and a third light splitting structure L3, and the widths of the first light splitting structure L1, the second light splitting structure L2 and the third light splitting structure L3 each is equal to ⅓ of the width of the pixel island S. In this way, the sub-pixels below each light splitting repeating unit 201 may be arranged complementary in a staggered mode to each other relative to the position of the corresponding light splitting structures L.

Optionally, in the above display apparatus provided by the embodiments of the present disclosure, the pixel island S includes m*N+k sub-pixels, N is an integer larger than or equal to 2, k is an integer larger than or equal to 1, and no common divisor of k and m exits other than 1. In the row direction X, a ratio of a width 'a' of a sub-pixel to a width 'b' of a gap between two adjacent sub-pixels is larger than or equal to 0.95/(m−1) and smaller than or equal to 1.05/(m−1). In some embodiments, a/b equals to 1/(m−1), so the larger the quantity 'm' of the light splitting structures L covered on each pixel island S is, the larger the gap between two adjacent sub-pixels is. In this way, the sub-pixels under each light splitting repeating unit 201 may be staggered and complementary relative to the corresponding light splitting structures L, and defect of moiré patterns caused by excessively large widths of the sub-pixels may further be avoided.

Exemplarily, as shown in FIG. 4, m is 2, N is 4, k is 1, the pixel island S includes nine sub-pixels, and the ratio of the width 'a' of each sub-pixel to the width 'b' of the gap between the adjacent two sub-pixels is 1:1 (namely, a proportion of opening widths of the sub-pixels is 50%). In one light splitting repeating unit 201, one light splitting structure L (for example, the first light splitting structure L1) correspondingly covers 5 sub-pixels, and the other light splitting structure L (for example, the second light splitting structure L2) correspondingly covers 4 sub-pixels.

As shown in FIG. 7, m is 3, N is 2, k is 2, each pixel island S includes eight sub-pixels, and the ratio of the width 'a' of each sub-pixel to the width 'b' of the gap of two adjacent sub-pixels is 1:2 (namely, the proportion of the opening widths of the sub-pixels is ⅓). In one light splitting repeating unit 201, the first light splitting structure L1 correspondingly covers three sub-pixels (respectively the first sub-pixel 1, the fourth sub-pixel 4, and the seventh sub-pixel 7), the second light splitting structure L2 correspondingly covers three sub-pixels (respectively the second sub-pixel 2, the fifth sub-pixel 5 and the eighth sub-pixel 8), and the third light splitting structure L3 correspondingly covers two sub-pixels (respectively the third sub-pixel 3 and the sixth sub-pixel 6).

Figure 8:
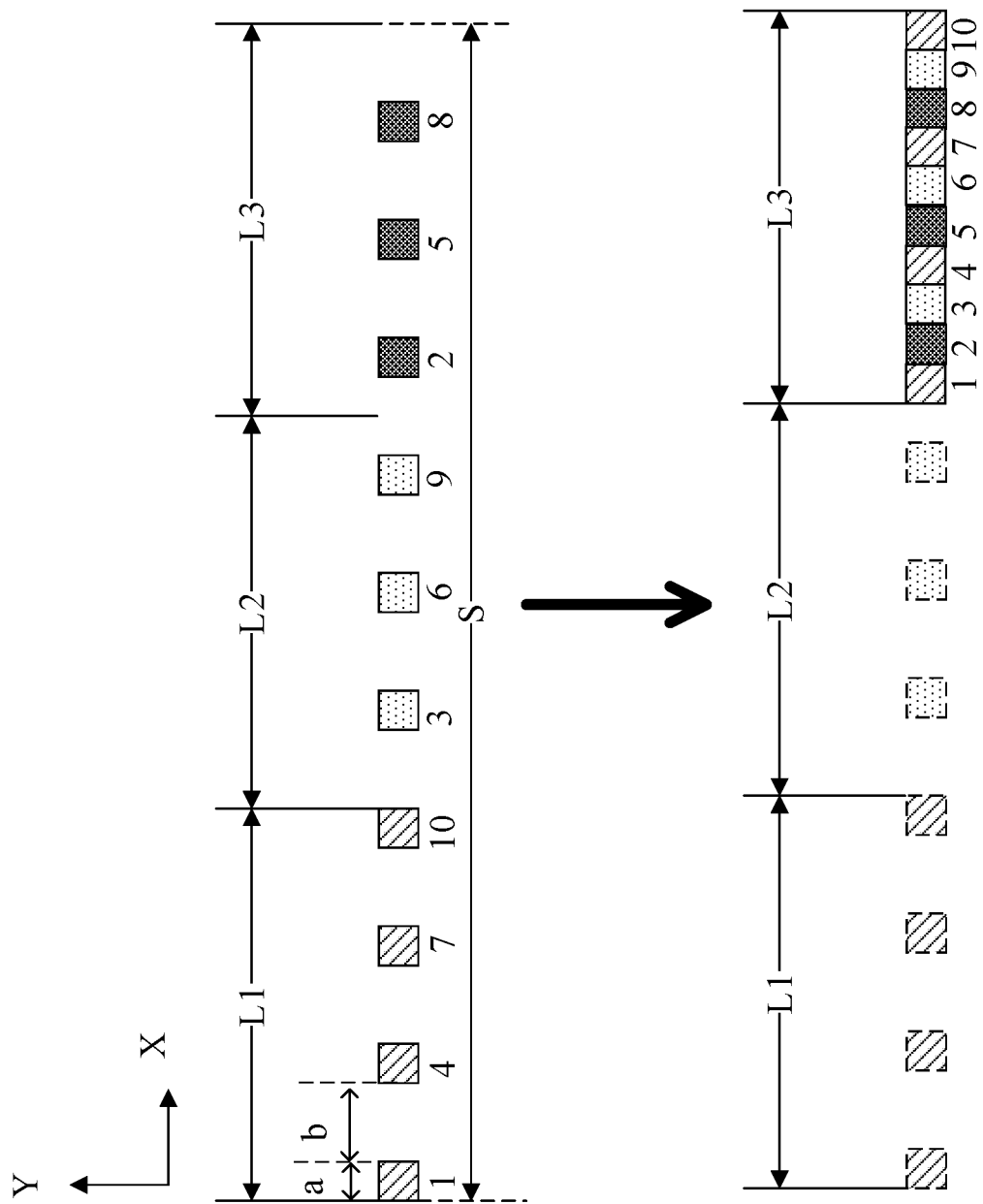
FIG. 8 is yet another diagram of complementary arrangement of relative positions of sub-pixels in a pixel island and a corresponding light splitting structure provided by an embodiment of the present disclosure.

As shown in FIG. 8, m is 3, N is 3, k is 1, each pixel island S includes ten sub-pixels, and the ratio of the width 'a' of each sub-pixel to the width 'b' of the gap of two adjacent sub-pixels is 1:2 (namely, the proportion of the opening widths of the sub-pixels is ⅓). In one light splitting repeating unit 201, the first light splitting structure L1 correspondingly covers four sub-pixels (respectively the first sub-pixel 1, the fourth sub-pixel 4, the seventh sub-pixel 7 and a tenth sub-pixel 10), the second light splitting structure L2 correspondingly covers three sub-pixels (respectively the third sub-pixel 3, the sixth sub-pixel 6 and the ninth sub-pixel 9), and the third light splitting structure L3 correspondingly covers three sub-pixels (respectively the second sub-pixel 2, the fifth sub-pixel 5 and the eighth sub-pixel 8).

Figure 9:
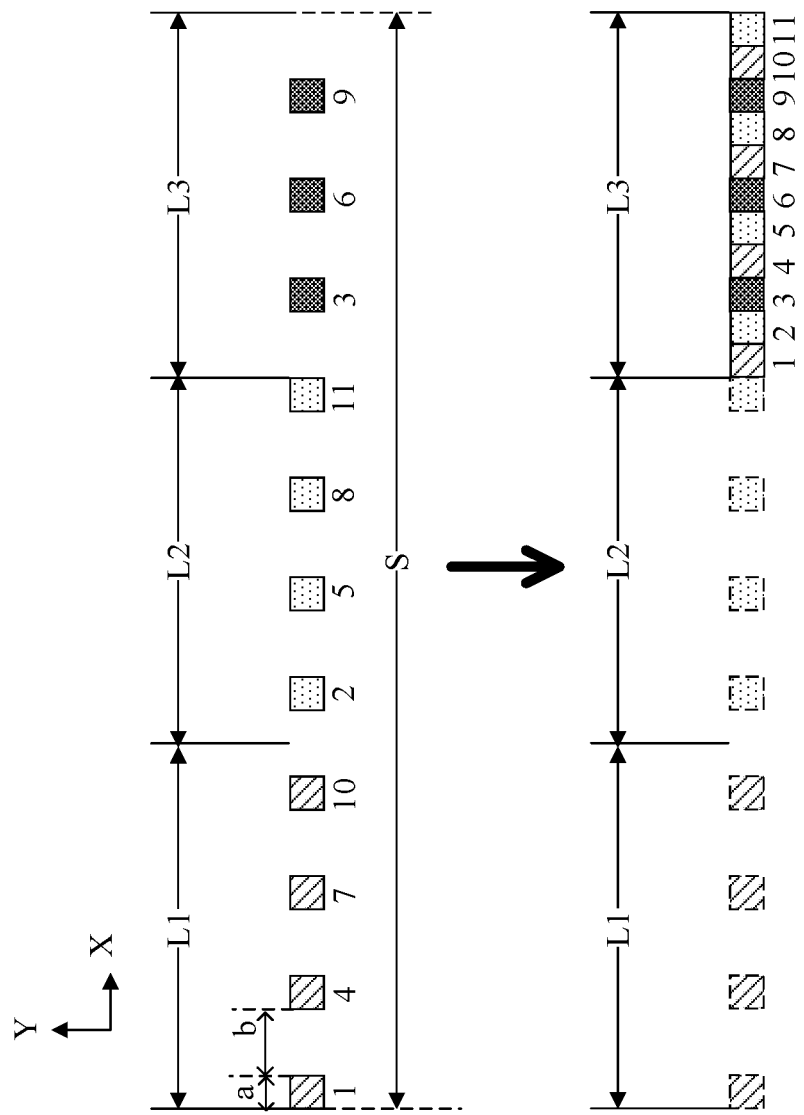
FIG. 9 is yet another diagram of complementary arrangement of relative positions of sub-pixels in a pixel island and a corresponding light splitting structure provided by an embodiment of the present disclosure.

As shown in FIG. 9, m is 3, N is 3, k is 2, each pixel island S includes eleven sub-pixels, and the ratio of the width 'a' of each sub-pixel to the width 'b' of the gap of two adjacent sub-pixels is 1:2 (namely, the proportion of the opening widths of the sub-pixels is ⅓). In one light splitting repeating unit 201, the first light splitting structure L1 correspondingly covers four sub-pixels (respectively the first sub-pixel 1, the fourth sub-pixel 4, the seventh sub-pixel 7 and the tenth sub-pixel 10), the second light splitting structure L2 correspondingly covers four sub-pixels (respectively the second sub-pixel 2, the fifth sub-pixel 5, the eighth sub-pixel 8, and an eleventh sub-pixel 11), and the third light splitting structure L3 correspondingly covers three sub-pixels (respectively the third sub-pixel 3, the sixth sub-pixel 6 and the ninth sub-pixel 9).

Figure 10:
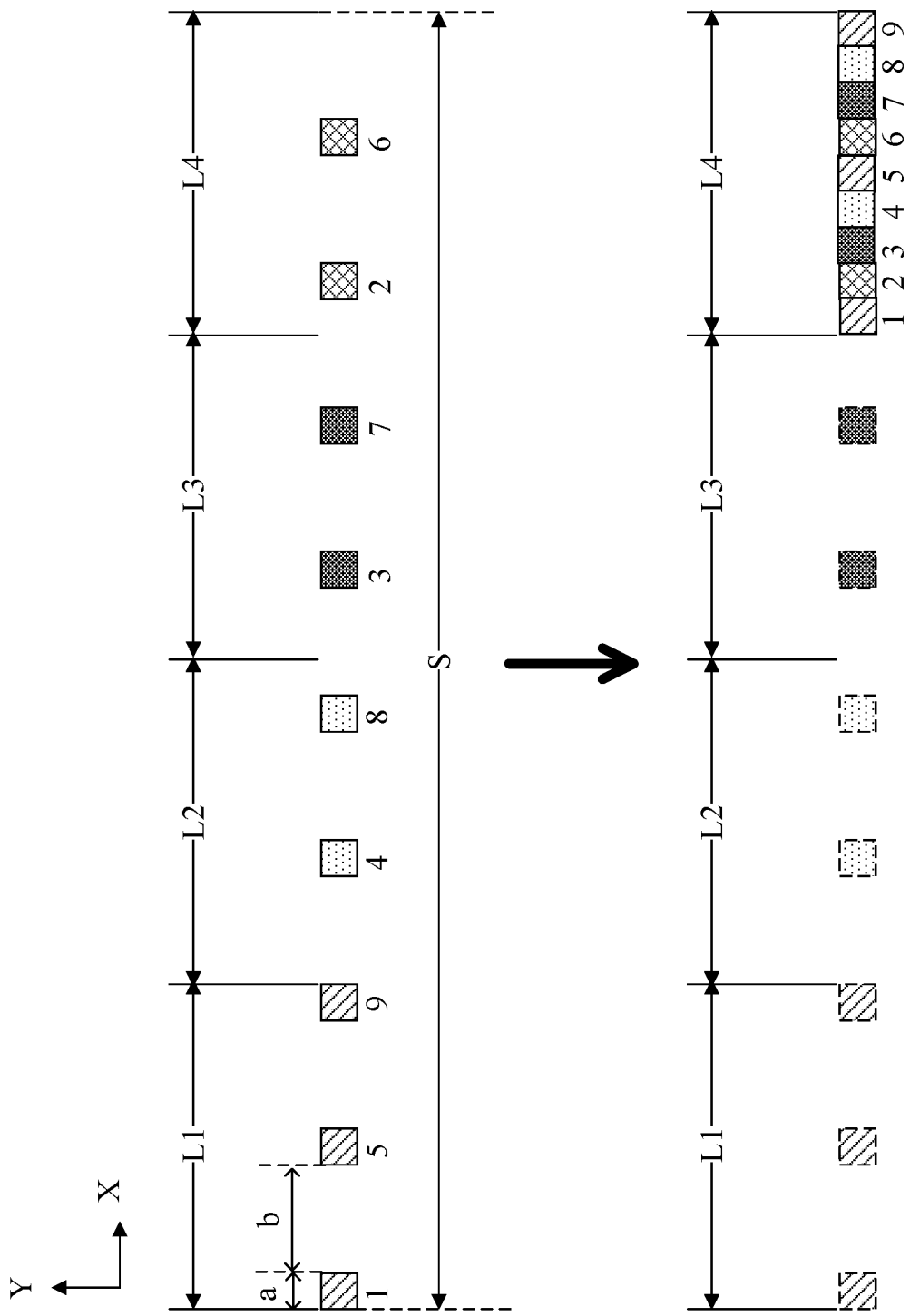
FIG. 10 is yet another diagram of complementary arrangement of relative positions of sub-pixels in a pixel island and a corresponding light splitting structure provided by an embodiment of the present disclosure.

As shown in FIG. 10, m is 4, N is 2, k is 1, each pixel island S includes nine sub-pixels, and the ratio of the width 'a' of each sub-pixel to the width 'b' of the gap of two adjacent sub-pixels is 1:3 (namely, the proportion of the opening widths of the sub-pixels is ¼). In one light splitting repeating unit 201, the first light splitting structure L1 correspondingly covers three sub-pixels (respectively, the first sub-pixel 1, the fifth sub-pixel 5, and the ninth sub-pixel 9), the second light splitting structure L2 correspondingly covers two sub-pixels (respectively the fourth sub-pixel 4 and the eighth sub-pixel 8), the third light splitting structure L3 correspondingly covers two sub-pixels (respectively the third sub-pixel 3 and the seventh sub-pixel 7) and a fourth light splitting structure L4 correspondingly covers two sub-pixels (respectively the second sub-pixel 2 and the sixth sub-pixel 6).

Figure 11:
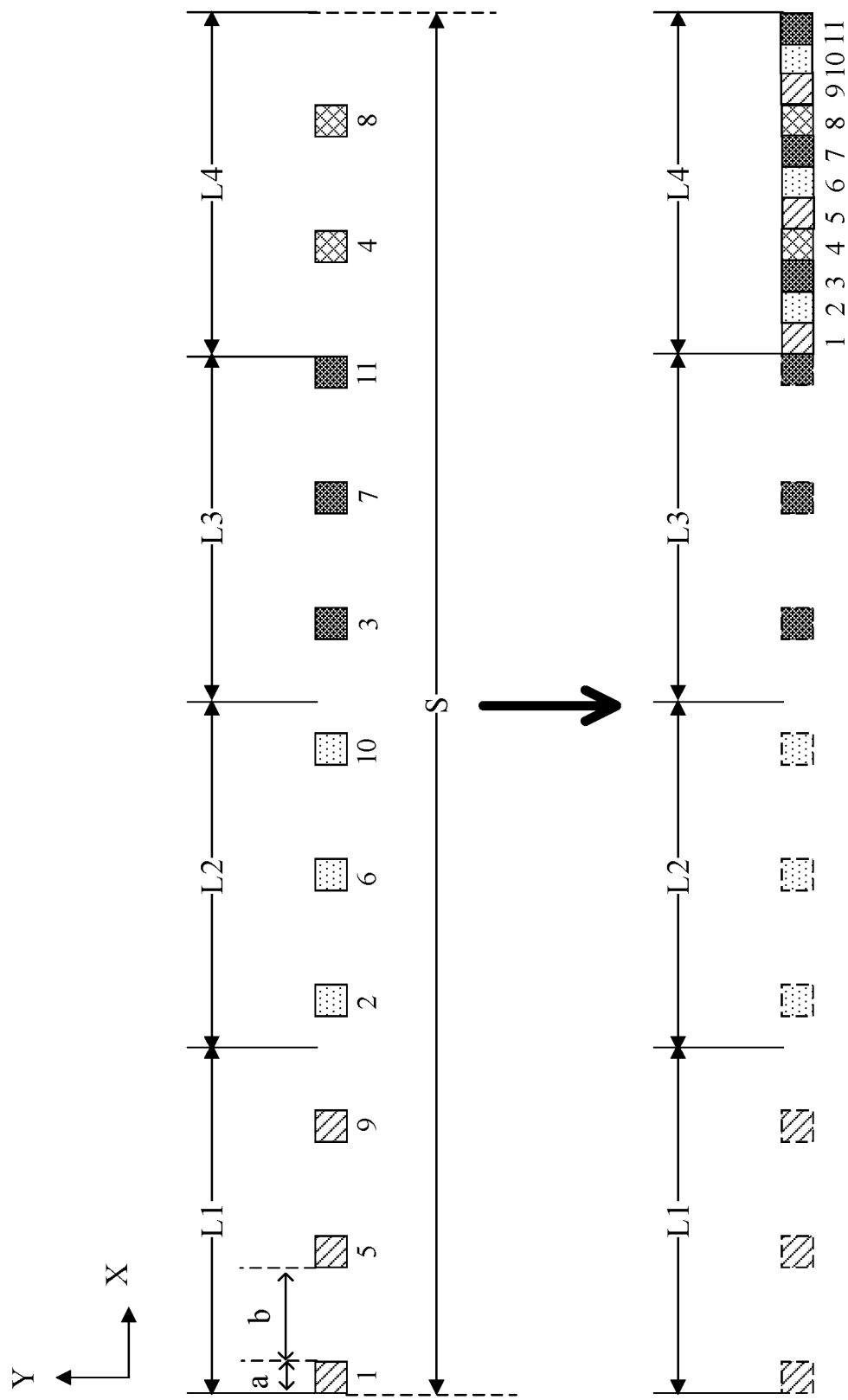
FIG. 11 is yet another diagram of complementary arrangement of relative positions of sub-pixels in a pixel island and a corresponding light splitting structure provided by an embodiment of the present disclosure.

As shown in FIG. 11, m is 4, N is 2, k is 3, each pixel island S includes eleven sub-pixels, and the ratio of the width 'a' of each sub-pixel to the width 'b' of the gap of two adjacent sub-pixels is 1:3 (namely, the proportion of the opening widths of the sub-pixels is ¼). In one light splitting repeating unit 201, the first light splitting structure L1 correspondingly covers three sub-pixels (respectively the first sub-pixel 1, the fifth sub-pixel 5, and the ninth sub-pixel 9), the second light splitting structure L2 correspondingly covers three sub-pixels (respectively the second sub-pixel 2, the sixth sub-pixel 6 and the tenth sub-pixel 10), the third light splitting structure L3 correspondingly covers three sub-pixels (respectively the third sub-pixel 3, the seventh sub-pixel 7 and the eleventh sub-pixel 11) and the fourth light splitting structure L4 correspondingly covers two sub-pixels (respectively the fourth sub-pixel 4 and the eighth sub-pixel 8).

Figure 12:
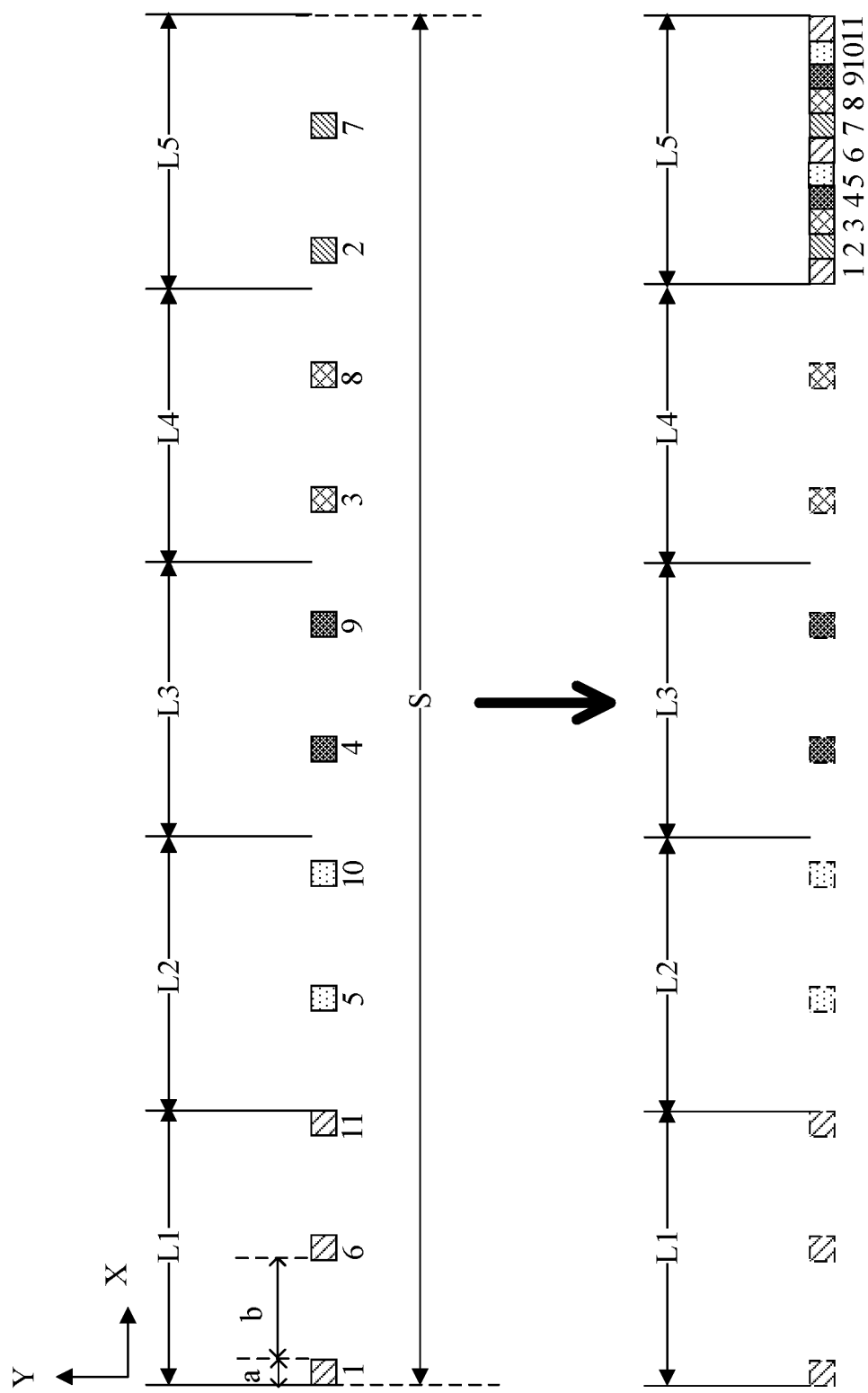
FIG. 12 is yet another diagram of complementary arrangement of relative positions of sub-pixels in a pixel island and a corresponding light splitting structure provided by an embodiment of the present disclosure.

As shown in FIG. 12, m is 5, N is 2, k is 1, each pixel island S includes eleven sub-pixels, and the ratio of the width 'a' of each sub-pixel to the width 'b' of the gap of two adjacent sub-pixels is 1:4 (namely, the proportion of the opening widths of the sub-pixels is ⅕). In one light splitting repeating unit 201, the first light splitting structure L1 correspondingly covers three sub-pixels (respectively, the first sub-pixel 1, the sixth sub-pixel 6 and the eleventh sub-pixel 11), the second light splitting structure L2 correspondingly covers two sub-pixels (respectively the fifth sub-pixel 5 and the tenth sub-pixel 10), the third light splitting structure L3 correspondingly covers two sub-pixels (respectively the fourth sub-pixel 4 and the ninth sub-pixel 9), the fourth light splitting structure L4 correspondingly covers two sub-pixels (respectively the third sub-pixel 3 and the eighth sub-pixel 8) and a fifth light splitting structure L5 correspondingly covers two sub-pixels (respectively the second sub-pixel 2 and the seventh sub-pixel 7).

Figure 13:
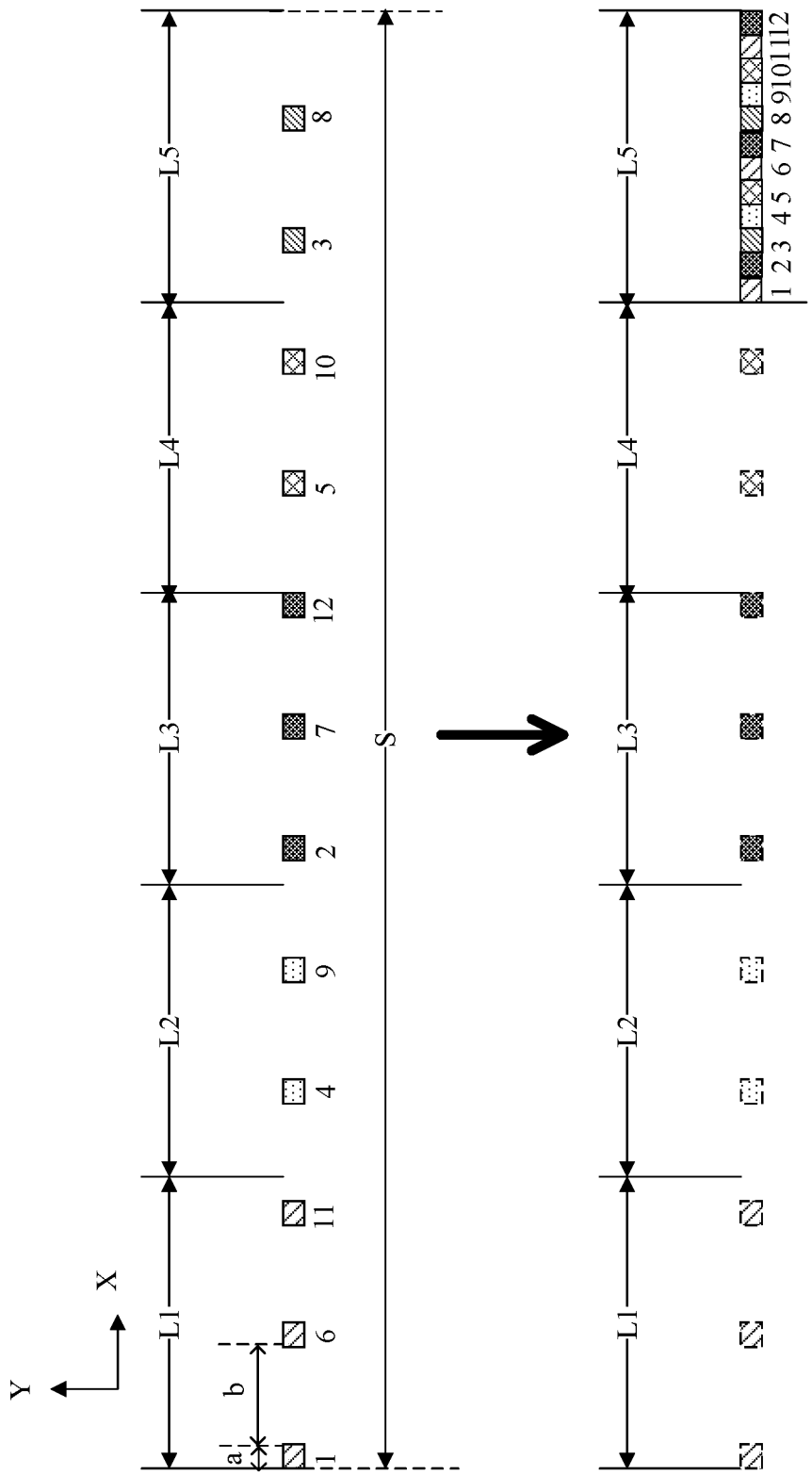
FIG. 13 is yet another diagram of complementary arrangement of relative positions of sub-pixels in a pixel island and a corresponding light splitting structure provided by an embodiment of the present disclosure.

As shown in FIG. 13, m is 5, N is 2, k is 2, each pixel island S includes twelve sub-pixels, and the ratio of the width 'a' of each sub-pixel to the width 'b' of the gap of two adjacent sub-pixels is 1:4 (namely, the proportion of the opening widths of the sub-pixels is ⅕). In one light splitting repeating unit 201, the first light splitting structure L1 correspondingly covers three sub-pixels (respectively the first sub-pixel 1, the sixth sub-pixel 6 and the eleventh sub-pixel 11), the second light splitting structure L2 correspondingly covers two sub-pixels (respectively the fourth sub-pixel 4 and the ninth sub-pixel 9), the third light splitting structure L3 correspondingly covers three sub-pixels (respectively the second sub-pixel 2, the seventh sub-pixel 7 and a twelfth sub-pixel 12), the fourth light splitting structure L4 correspondingly covers two sub-pixels (respectively the fifth sub-pixel 5 and the tenth sub-pixel 10) and the fifth light splitting structure L5 correspondingly covers two sub-pixels (respectively, the third sub-pixel 3 and the eighth sub-pixel 8).

Figure 14:
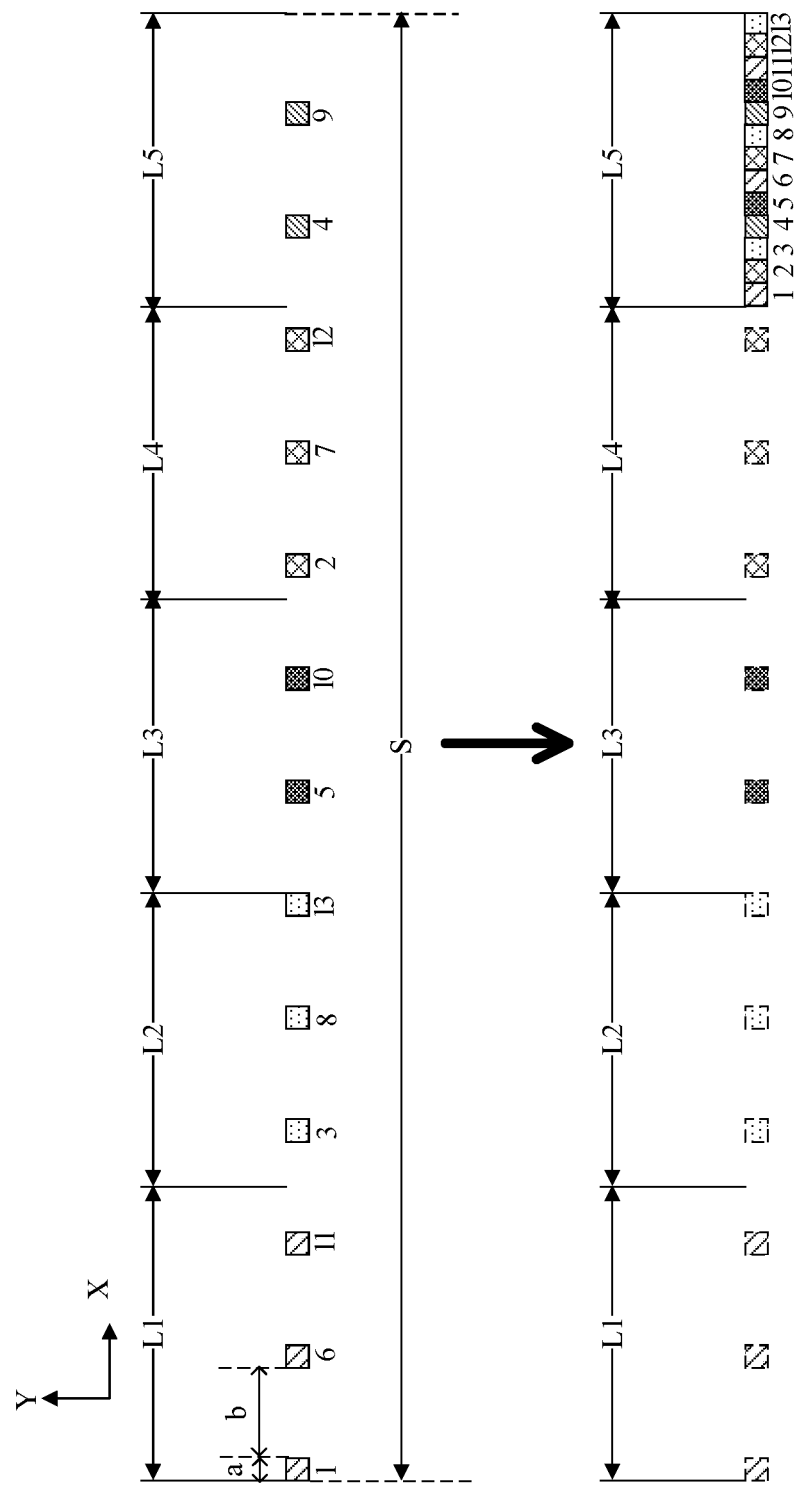
FIG. 14 is yet another diagram of complementary arrangement of relative positions of sub-pixels in a pixel island and a corresponding light splitting structure provided by an embodiment of the present disclosure.

As shown in FIG. 14, m is 5, N is 2, k is 3, each pixel island S includes thirteen sub-pixels, and the ratio of the width 'a' of each sub-pixel to the width 'b' of the gap of two adjacent sub-pixels is 1:4 (namely, the proportion of the opening widths of the sub-pixels is ⅕). In one light splitting repeating unit 201, the first light splitting structure L1 correspondingly covers three sub-pixels (respectively the first sub-pixel 1, the sixth sub-pixel 6 and the eleventh sub-pixel 11), the second light splitting structure L2 correspondingly covers three sub-pixels (respectively the third sub-pixel 3, the eighth sub-pixel 8 and a thirteenth sub-pixel 13), the third light splitting structure L3 correspondingly covers two sub-pixels (respectively the fifth sub-pixel 5 and the tenth sub-pixel 10), the fourth light splitting structure L4 correspondingly covers three sub-pixels (respectively the second sub-pixel 2, the seventh sub-pixel 7 and the twelfth sub-pixel 12) and the fifth light splitting structure L5 correspondingly covers two sub-pixels (respectively the fourth sub-pixel 4 and the ninth sub-pixel 9).

Figure 15:
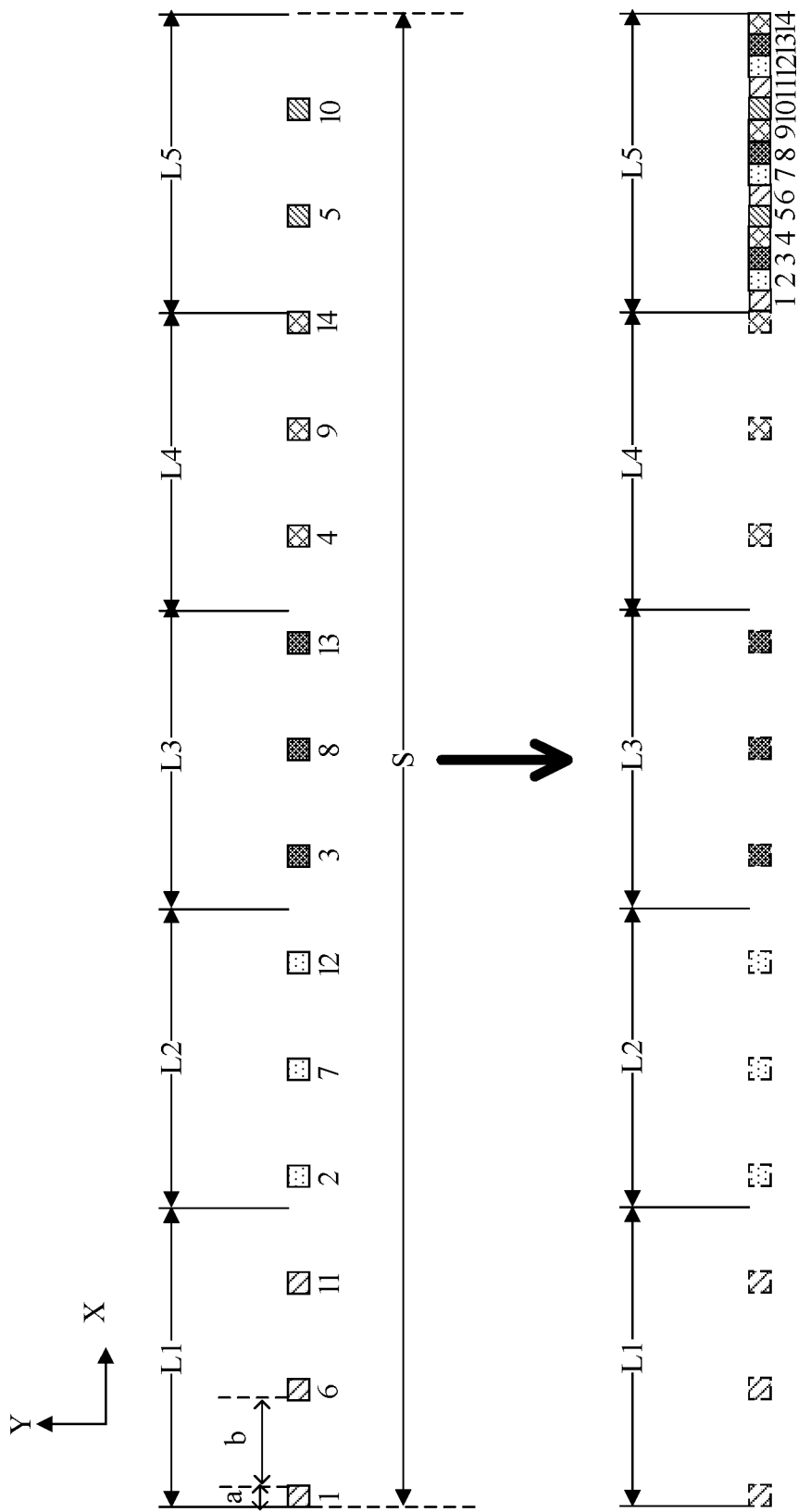
FIG. 15 is yet another diagram of complementary arrangement of relative positions of sub-pixels in a pixel island and a corresponding light splitting structure provided by an embodiment of the present disclosure.

As shown in FIG. 15, m is 5, N is 2, k is 4, each pixel island S includes fourteen sub-pixels, and the ratio of the width 'a' of each sub-pixel to the width 'b' of the gap of two adjacent sub-pixels is 1:4 (namely, the proportion of the opening widths of the sub-pixels is ⅕). In one light splitting repeating unit 201, the first light splitting structure L1 correspondingly covers three sub-pixels (respectively, the first sub-pixel 1, the sixth sub-pixel 6 and the eleventh sub-pixel 11), the second light splitting structure L2 correspondingly covers three sub-pixels (respectively the second sub-pixel 2, the seventh sub-pixel 7 and the twelfth sub-pixel 12), the third light splitting structure L3 correspondingly covers three sub-pixels (respectively the third sub-pixel 3, the eighth sub-pixel 8 and the thirteenth sub-pixel 13), the fourth light splitting structure L4 correspondingly covers three sub-pixels (respectively the fourth sub-pixel 4, the ninth sub-pixel 9 and a fourteenth sub-pixel 14) and the fifth light splitting structure L5 correspondingly covers two sub-pixels (respectively the fifth sub-pixel 5 and the tenth sub-pixel 10).

Figure 16:
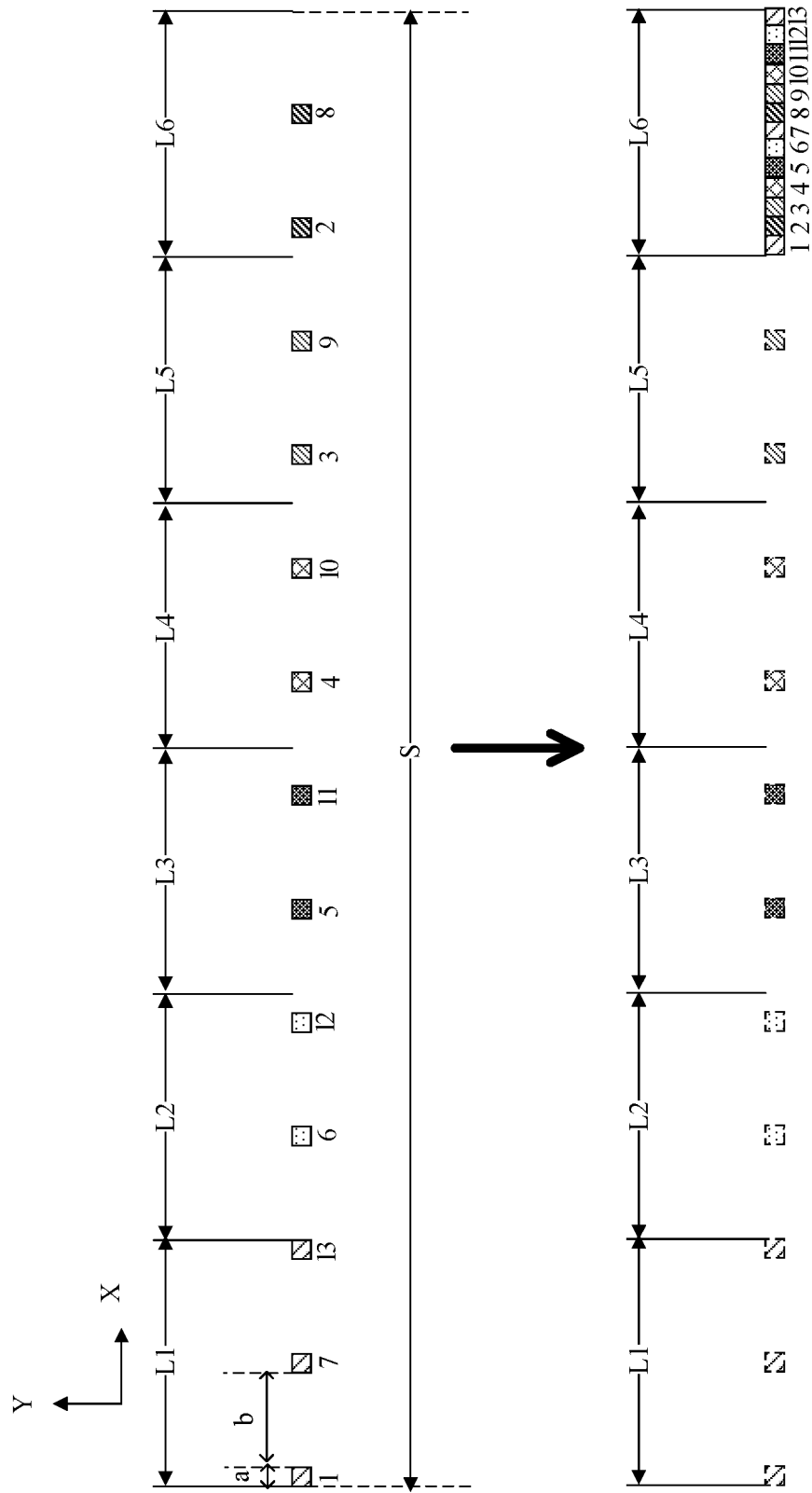
FIG. 16 is yet another diagram of complementary arrangement of relative positions of sub-pixels in a pixel island and a corresponding light splitting structure provided by an embodiment of the present disclosure.

As shown in FIG. 16, m is 6, N is 2, k is 1, each pixel island S includes thirteen sub-pixels, and the ratio of the width 'a' of each sub-pixel to the width 'b' of the gap of two adjacent sub-pixels is 1:5 (namely, the proportion of the opening widths of the sub-pixels is ⅙). In one light splitting repeating unit 201, the first light splitting structure L1 correspondingly covers three sub-pixels (respectively the first sub-pixel 1, the seventh sub-pixel 7 and the thirteenth sub-pixel 13), the second light splitting structure L2 correspondingly covers two sub-pixels (respectively the sixth sub-pixel 6 and the twelfth sub-pixel 12), the third light splitting structure L3 correspondingly covers two sub-pixels (respectively the fifth sub-pixel 5 and the eleventh sub-pixel 11), the fourth light splitting structure L4 correspondingly covers two sub-pixels (respectively the fourth sub-pixel 4 and the tenth sub-pixel 10), the fifth light splitting structure L5 correspondingly covers two sub-pixels (respectively the third sub-pixel 3 and the ninth sub-pixel 9) and a sixth light splitting structure L6 correspondingly covers two sub-pixels (respectively the second sub-pixel 2 and the eighth sub-pixel 8).

Figure 17:
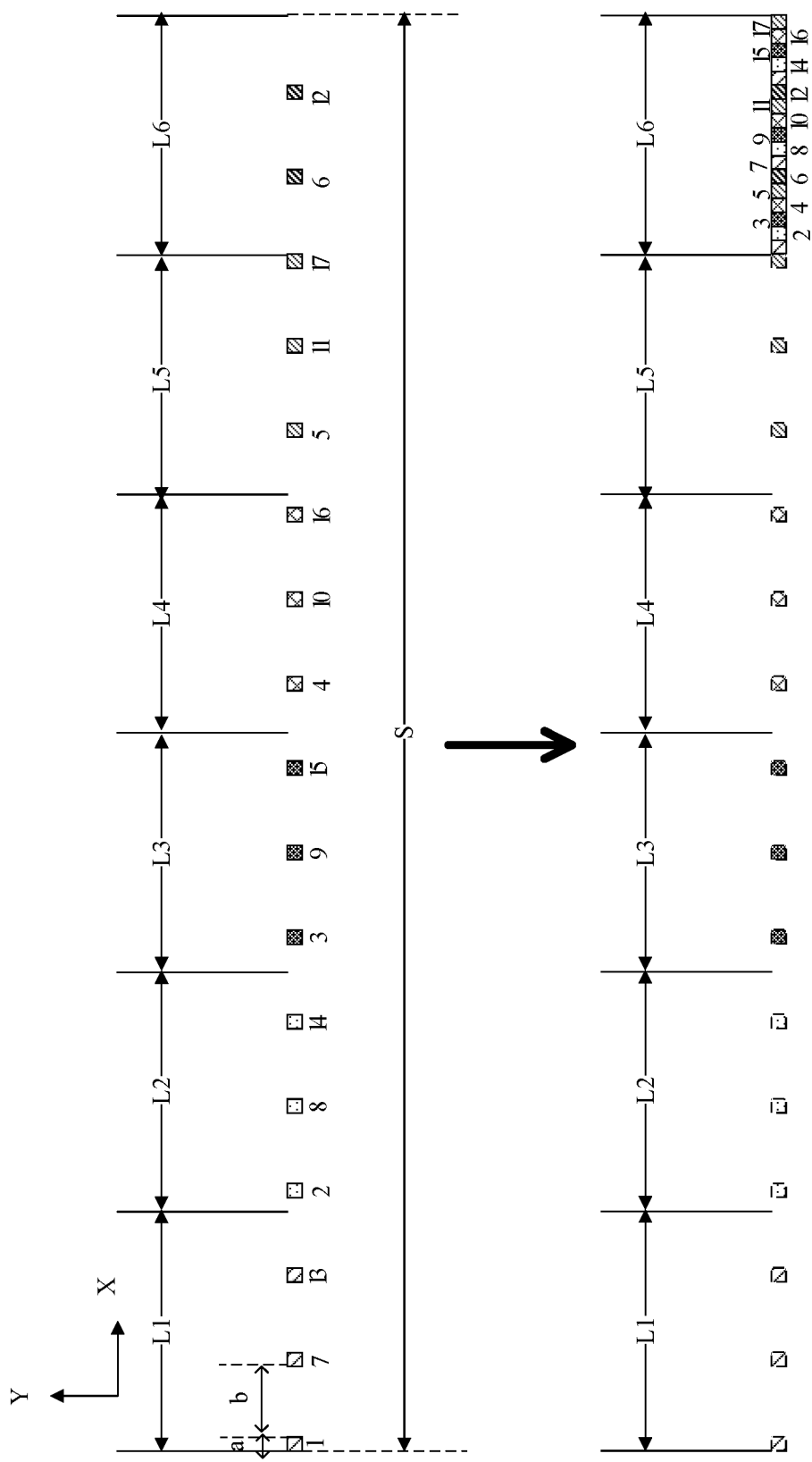
FIG. 17 is yet another diagram of complementary arrangement of relative positions of sub-pixels in a pixel island and a corresponding light splitting structure provided by an embodiment of the present disclosure.

As shown in FIG. 17, m is 6, N is 2, k is 5, each pixel island S includes seventeen sub-pixels, and the ratio of the width 'a' of each sub-pixel to the width 'b' of the gap of two adjacent sub-pixels is 1:5 (namely, the proportion of the opening widths of the sub-pixels is ⅙). In one light splitting repeating unit 201, the first light splitting structure L1 correspondingly covers three sub-pixels (respectively the first sub-pixel 1, the seventh sub-pixel 7 and the thirteenth sub-pixel 13), the second light splitting structure L2 correspondingly covers three sub-pixels (respectively the second sub-pixel 2, the eighth sub-pixel 8 and the fourteenth sub-pixel 14), the third light splitting structure L3 correspondingly covers three sub-pixels (respectively the third sub-pixel 3, the ninth sub-pixel 9 and a fifteenth sub-pixel 15), the fourth light splitting structure L4 correspondingly covers three sub-pixels (respectively the fourth sub-pixel 4, the tenth sub-pixel 10 and a sixteenth sub-pixel 16), the fifth light splitting structure L5 correspondingly covers three sub-pixels (respectively the fifth sub-pixel 5, the eleventh sub-pixel 11 and a seventeenth sub-pixel 17) and the sixth light splitting structure L6 correspondingly covers two sub-pixels (respectively the sixth sub-pixel 6 and the twelfth sub-pixel 12).

In the present disclosure, the serial numbers 1-17 of the above sub-pixels respectively represent relative positions between the sub-pixels and the light splitting structures L right above them. As shown in FIG. 4, and FIG. 7 to FIG. 17, the relative positions between m*N+k sub-pixels in each pixel island S and the light splitting structures L right above them may realize complementary arrangement.

Figure 18:
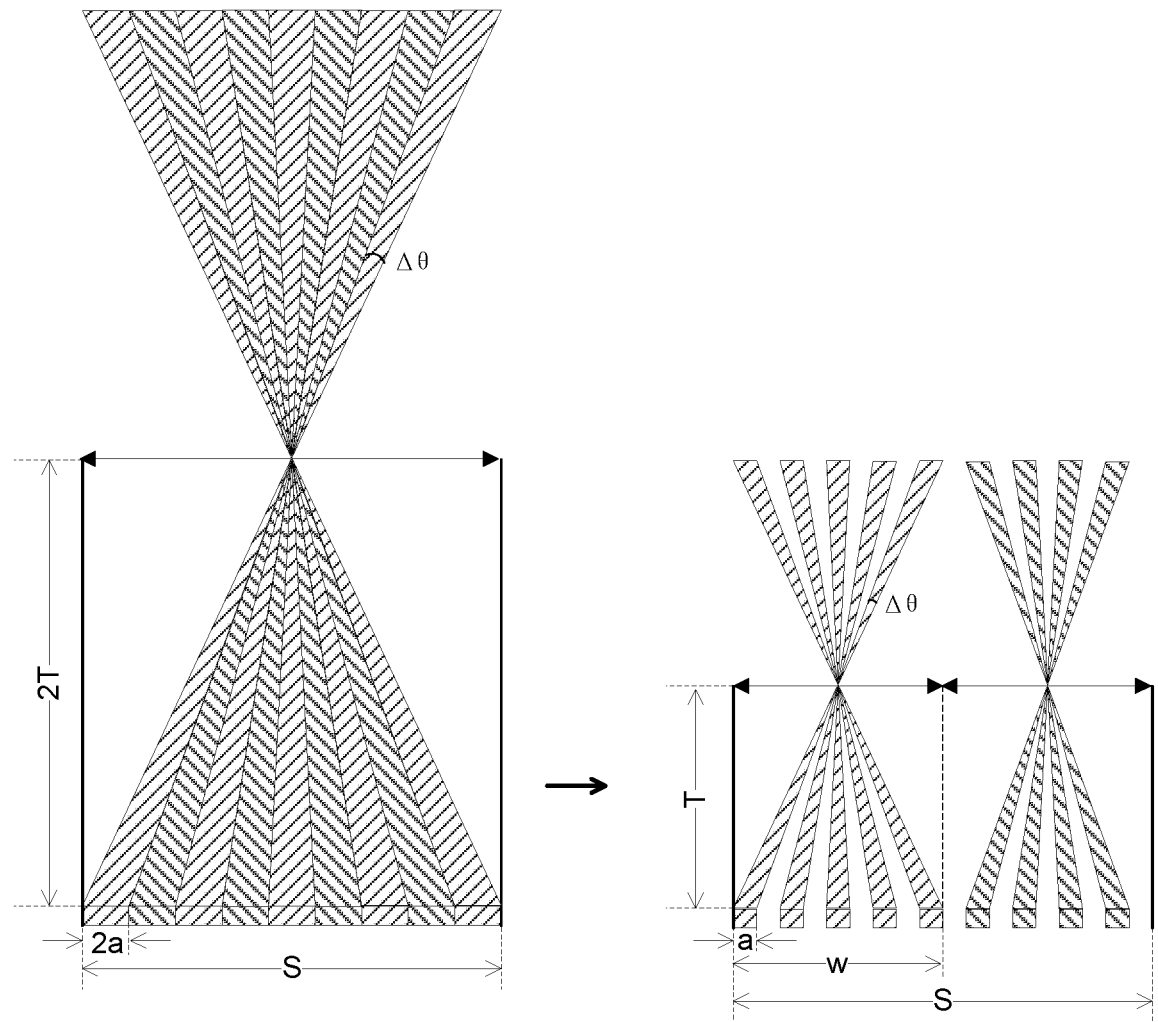
FIG. 18 is a schematic diagram of a thinned thickness of a display apparatus provided by an embodiment of the present disclosure.

Optionally, in the above display apparatus provided by the embodiments of the present disclosure, as shown in FIG. 18, in a direction perpendicular to the display panel 101, a perpendicular distance T between the pixel island S and the light splitting structure L satisfies the following formula:

$$0.95 * \frac{W}{2} * \cot\frac{(m*N+k)*\Delta\theta}{2} \le T \le 1.05 * \frac{W}{2} * \cot\frac{(m*N+k)*\Delta\theta}{2},$$

w is a width of one of the light splitting structures L in the row direction X, and $\Delta\theta$ is an angle of a viewpoint formed by light emitted by one of the sub-pixels passing the corresponding light splitting structure L. In some embodiments, $$T = \frac{W}{2} * \cot\frac{(m*N+k)*\Delta\theta}{2}.$$

As shown in FIG. 18, when the sub-pixels are arranged continuously, assuming a placement height of the light splitting structure L to be 2T, and the angle of each viewpoint to be $\Delta\theta$, when each pixel island S is covered with two light splitting structures L and the opening ratio of the sub-pixel is 50%, in order to obtain the same viewpoint density, according to the above formula, it may be concluded that the placement height of the light splitting structure L needs to be changed to be T in the present disclosure. Therefore, the embodiments of the present disclosure may reduce a thickness of the display apparatus. Similarly, when one pixel island S corresponds to three or more (for example, m) light splitting structures L, the placement height of the light splitting structure L relative to the sub-pixel may be changed to be 1/m of an original height, thereby further reducing the thickness of the apparatus. In addition, when T satisfies the formula of $$0.95 * \frac{W}{2} * \cot\frac{(m*N+k)*\Delta\theta}{2} \le T \le 1.05 * \frac{W}{2} * \cot\frac{(m*N+k)*\Delta\theta}{2},$$

interference defect caused by excessively high or low placement height of the light splitting structure L may also be effectively avoided.

Optionally, in the above display apparatus provided by the embodiments of the present disclosure, as shown in FIG. 18, according to a triangular relationship, an angle of a gap between two adjacent viewpoints is $\Delta\theta$, which ensures that the relative positions of respective sub-pixels in the same pixel island S and the corresponding light splitting structures L are closely complementary.

Optionally, in the above display apparatus provided by the embodiments of the present disclosure, the light splitting structure L is a cylindrical lens, and a focal length of the cylindrical lens is equal to the perpendicular distance T between the pixel island S and the light splitting structure L, so that the pixel island S is located on a focal plane of the cylindrical lens. Because in a human eye observation space, the plurality of sub-pixels emit light continuously, a plurality of 3D viewpoints may be formed continuously. The left and right eyes of an observer receive a view of a viewpoint respectively, and through grayscale adjustment of the sub-pixels, grayscales of different viewpoints are different, so there will be a time difference between the eyes, thus forming a 3D effect. Moreover, since the plurality of 3D viewpoints are formed, as the human eye moves, the viewpoints are switched, and a multi-viewpoint 3D display function can be realized.

In some embodiments, the above light splitting structure L may also be a barrier grating or a liquid crystal grating. Of course, the light splitting structure L may also be other types of gratings, or the light splitting structure L may also be other optical devices that can achieve a light splitting effect, which is not limited here.

Figure 19:
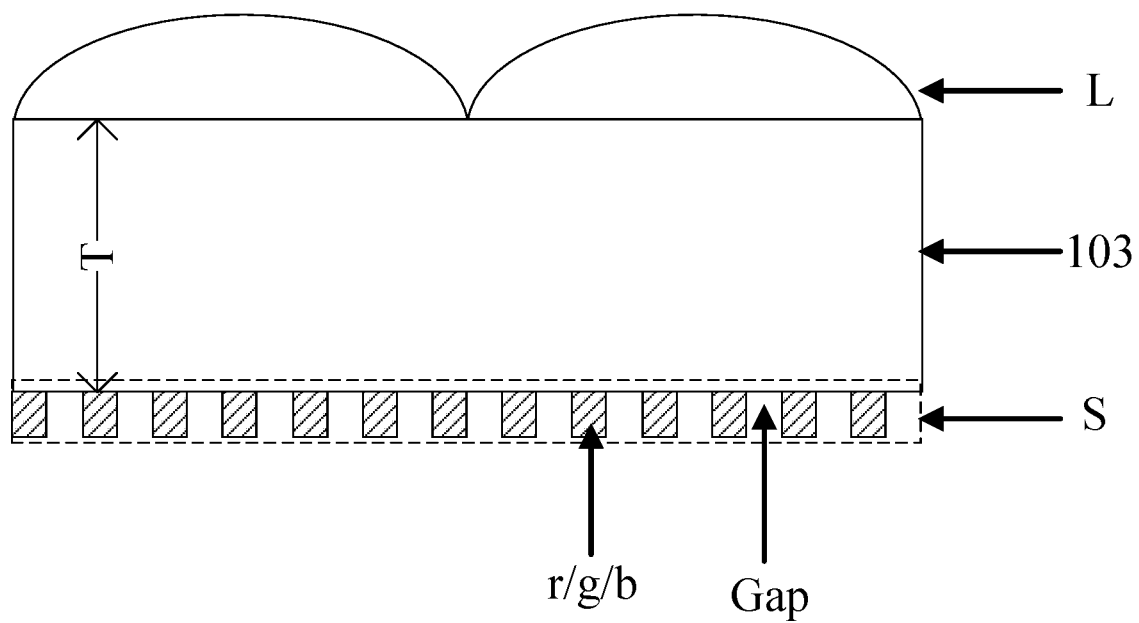
FIG. 19 is a schematic structural diagram of a region where a pixel island is located provided by an embodiment of the present disclosure.

Optionally, in the above display apparatus provided by the embodiments of the present disclosure, in order to ensure that the pixel island S is located on the focal plane of the cylindrical lens, as shown in FIG. 19, a spacer dielectric layer 103 with a certain thickness is bonded between the display panel 101 and the light splitting structure L, so that a distance between the pixel island S and the cylindrical lens is equal to the focal length of the cylindrical lens. The spacer dielectric layer 103 may be prepared by selecting a material with a larger refractive index and better light transmittance, such as optically transparent glass.

Optionally, in the above display apparatus provided by the embodiments of the present disclosure, every three pixel islands S continuously arranged in the column direction Y are a pixel repeating unit P. In one pixel repeating unit P, the sub-pixels of the same pixel island S are the same in display color, and the sub-pixels of different pixel islands S are different in the display color.

In some embodiments, the every three pixel islands S continuously arranged may sequentially include red sub-pixels r, green sub-pixels g, and blue sub-pixels b. The quantity of red sub-pixels r, green sub-pixels g and blue sub-pixels b is the same. The red sub-pixels r are arranged in a row in a first direction X, the green sub-pixels g are arranged in a row in the first direction X, and the blue sub-pixels b are arranged in a row in the first direction X. Red sub-pixel rows, green sub-pixel rows and blue sub-pixel rows are arranged in a second direction Y, so that the sub-pixels in the pixel island S are arranged in an array.

In some embodiments, in the above display apparatus provided by the embodiments of the present disclosure, the display panel 101 may be an organic light emitting diode display panel, a quantum dot light emitting diode display panel, a micro light emitting diode display panel, a liquid crystal display panel, etc., which is not limited here.

In addition, the above display apparatus provided by the embodiments of the present disclosure may be: a mobile phone, a tablet computer, a television, a display, a notebook computer, a digital photo frame, a navigator, a smart watch, a fitness wristband, a personal digital assistant, or any other product or component with a display function. Other essential components of the display apparatus should be understood by those of ordinary skill in the art, and will not be described in detail here, nor should it be regarded as a limitation of the present disclosure.

Based on the same inventive concept, embodiments of the present disclosure further provide a method for driving any of the above display apparatuses. Since the principle of problem solving of the method is similar to that of the above display apparatus, for implementation of the method, reference may be made to the above display apparatus. Repeated parts will not be described here.

Figure 20:
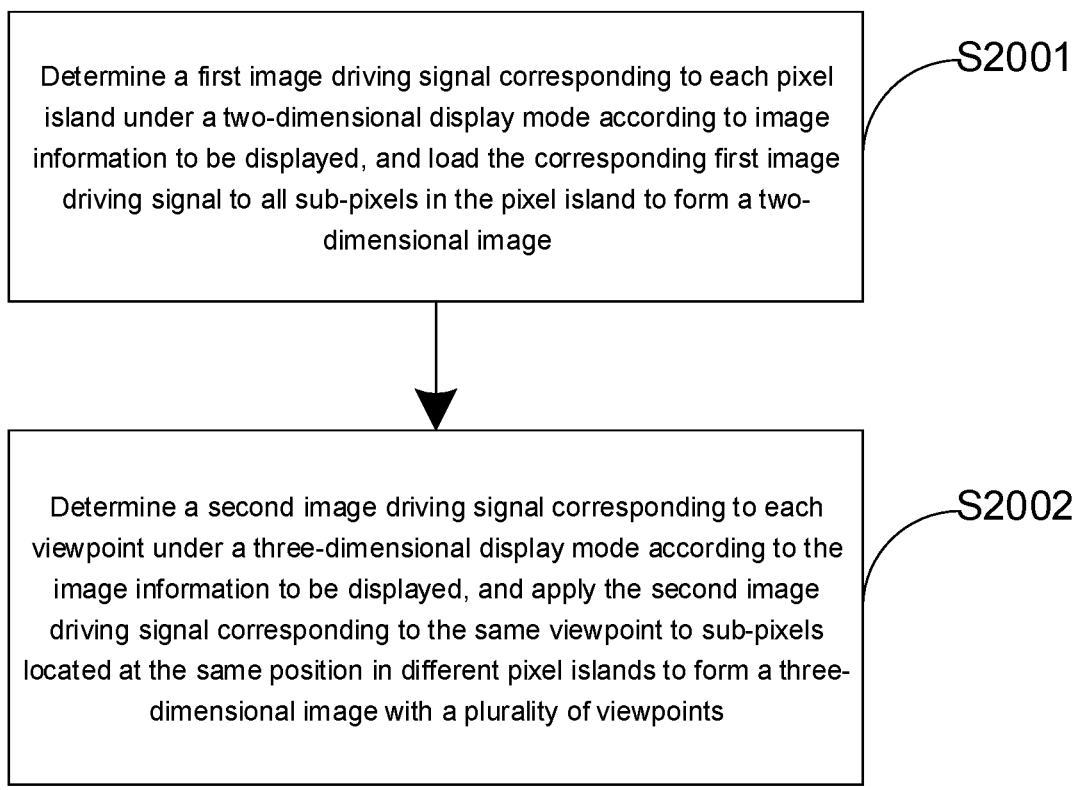
FIG. 20 is a flow chart of a method for driving a display apparatus provided by an embodiment of the present disclosure.

The method for driving the above display apparatus provided by the embodiments of the present disclosure, as shown in FIG. 20, may include the following steps.

S2001, a first image driving signal corresponding to each pixel island is determined under a two-dimensional display mode according to image information to be displayed, and the corresponding first image driving signal is loaded to all sub-pixels in the pixel island to form a two-dimensional image.

S2002, a second image driving signal corresponding to each viewpoint is determined under a three-dimensional display mode according to the image information to be displayed, and the second image driving signal corresponding to the same viewpoint is applied to sub-pixels located at the same position in different pixel islands to form a three-dimensional image with a plurality of viewpoints.

It should be noted that, in the above method provided by the embodiments of the present disclosure, an execution order of step S2001 and step S2002 is not limited to the above manner, that is, in specific implementation, step S2002 may also be executed first, and then step S2001 may be executed.

As can be seen from the above description, the above display apparatus and the driving method thereof provided by the embodiments of the present disclosure include the display panel, and the display panel includes: the plurality of pixel islands arranged at intervals in the row direction and the column direction, and each pixel island being provided with the plurality of sub-pixels arranged at intervals in the row direction; and the light splitting component, disposed on the display side of the display panel and including the plurality of light splitting structures extending in the column direction and continuously arranged in the row direction. In the row direction, every at least two adjacent light splitting structures are one light splitting repeating unit, each light splitting repeating unit covers one column of the pixel islands correspondingly. In one of the pixel islands, relative positions of all sub-pixels to the corresponding light splitting structures are complementary. By proposing an arrangement in which each pixel island is covered with a plurality of light splitting structures and the sub-pixels of the pixel island are staggered and complementary, the problem of "black region" moiré patterns in space when the sub-pixels emit light discontinuously is effectively solved, and a continuous large 3D viewing angle is achieved; and further, the placement height of the light splitting structures may be reduced, making the display apparatus lighter and thinner.

Obviously, those of skill in the art can make various changes and modifications to the embodiments of the present invention without departing from the spirit and scope of the embodiments of the present invention. Thus, provided that these changes and modifications of the embodiments of the present invention fall within the scope of the claims of the present invention and their equivalents, the present invention is also intended to cover these changes and modifications.

What is claimed is:

1. A display apparatus, comprising:
a display panel, comprising: a plurality of pixel islands arranged at intervals in a row direction and a column direction, wherein each pixel island is provided with a plurality of sub-pixels arranged at intervals in the row direction, and the row direction is perpendicular to the column direction; and
a light splitting component, disposed on a display side of the display panel and comprising a plurality of light splitting structures extending in the column direction and continuously arranged in the row direction, wherein in the row direction, every at least two adjacent light splitting structures are one light splitting repeating unit, each light splitting repeating unit covers one column of the pixel islands correspondingly, and relative positions of sub-pixels, in one pixel island covered by a first light splitting structure in one light splitting repeating unit, to the first light splitting structure are located in gaps among relative positions of sub-pixels, in the one pixel island covered by a second light splitting structure in the one light splitting repeating unit, to the second light splitting structure;
wherein in the row direction, a width of a light splitting structure is equal to 1/m of a width of a corresponding pixel island, wherein m is a total quantity of the light splitting structures in one of the light splitting repeating units;
the pixel island comprises m*N+k sub-pixels, wherein N is an integer larger than or equal to 2, k is an integer larger than or equal to 1, and no common divisor of k and m exists other than 1; and
in the row direction, a ratio of a width of one sub-pixel to a width of a gap between two adjacent sub-pixels is larger than or equal to 0.95/(m−1) and smaller than or equal to 1.05/(m−1).

2. The display apparatus according to claim 1, wherein relative positions of all sub-pixels, in the one pixel island covered by the one light splitting repeating unit, to the corresponding light splitting structures in the one light splitting repeating unit are continuously arranged in the row direction.

3. The display apparatus according to claim 1, wherein in a direction perpendicular to the display panel, a perpendicular distance T between the pixel island and the light splitting structure satisfies the following formula:

$$0.95 * \frac{W}{2} * \operatorname{Cot}\frac{(m*N+k)*\Delta\theta}{2} \leq T \leq 1.05 * \frac{W}{2} * \operatorname{Cot}\frac{(m*N+k)*\Delta\theta}{2},$$

wherein w is a width of one of the light splitting structures in the row direction, $\Delta\theta$ is an angle of a viewpoint formed by light emitted by one of the sub-pixels passing the corresponding light splitting structure.

4. The display apparatus according to claim 3, wherein an angle of a gap between two adjacent viewpoints is $\Delta\theta$.

5. The display apparatus according to claim 3, wherein the light splitting structure is a cylindrical lens, and a focal length of the cylindrical lens is equal to T.

6. The display apparatus according to claim 5, further comprising: a spacer dielectric layer between the display panel and the light splitting structure.

7. The display apparatus according to claim 1, wherein:
m is 2, N is 4, and k is 1; or,
m is 3, N is 2, and k is 2; or,
m is 3, N is 3, and k is 1; or,
m is 3, N is 3, and k is 2; or,
m is 4, N is 2, and k is 1; or,
m is 4, N is 2, and k is 3; or,
m is 5, N is 2, and k is 1; or,
m is 5, N is 2, and k is 2; or,
m is 5, N is 2, and k is 3; or,
m is 5, N is 2, and k is 4; or,
m is 6, N is 2, and k is 1; or,
m is 6, N is 2, and k is 5.

8. The display apparatus according to claim 1, wherein the light splitting structure is configured to enable light emitted by all sub-pixels covered by the light splitting structure to form a main lobe viewing angle, and enable light emitted by all sub-pixels covered by an adjacent light splitting structure to form a side lobe viewing angle; wherein
a shortest distance between a boundary of the main lobe viewing angle and a boundary of the side lobe viewing angle is equal to a width of the light splitting structure in the row direction, and a shortest distance between boundaries of any two adjacent side lobe viewing angles is equal to the width of the light splitting structure in the row direction.

9. The display apparatus according to claim 1, wherein every three of the pixel islands continuously arranged in the column direction are one pixel repeating unit; and
in one of pixel repeating units, sub-pixels of a same pixel island are same in display color, and sub-pixels of different pixel islands are different in the display color.

10. A method for driving the display apparatus according to claim 1, comprising:
determining a first image driving signal corresponding to each pixel island under a two-dimensional display mode according to image information to be displayed, and loading the first image driving signal to all sub-pixels in the pixel island to form a two-dimensional image; and
determining a second image driving signal corresponding to each viewpoint under a three-dimensional display mode according to the image information to be displayed, and applying the second image driving signal corresponding to a same viewpoint to sub-pixels located at a same position in different pixel islands to form a three-dimensional image with a plurality of viewpoints.

11. The display apparatus according to claim 1, wherein a pattern on an imaging surface formed by light emitted from the sub-pixels, in the one pixel island covered by the first light splitting structure, and passing through the first light splitting structure is complementary to a pattern on the imaging surface formed by light emitted from the sub-pixels, in the one pixel island covered by the second light splitting structure, and passing through the second light splitting structure.

12. A display apparatus, comprising:
a display panel, comprising: a plurality of pixel islands arranged at intervals in a row direction and a column direction, wherein each pixel island is provided with a plurality of sub-pixels arranged at intervals in the row direction, and the row direction is perpendicular to the column direction; and
a light splitting component, disposed on a display side of the display panel and comprising a plurality of light splitting structures extending in the column direction and continuously arranged in the row direction, wherein in the row direction, every at least two adjacent light splitting structures are one light splitting repeating unit, each light splitting repeating unit covers one column of the pixel islands correspondingly, and relative positions of sub-pixels, in one pixel island covered by a first light splitting structure in one light splitting repeating unit, to the first light splitting structure are located in gaps among relative positions of sub-pixels, in the one pixel island covered by a second light splitting structure in the one light splitting repeating unit, to the second light splitting structure;
wherein the light splitting structure is configured to enable light emitted by all sub-pixels covered by the light splitting structure to form a main lobe viewing angle, and enable light emitted by all sub-pixels covered by an adjacent light splitting structure to form a side lobe viewing angle; wherein
a shortest distance between a boundary of the main lobe viewing angle and a boundary of the side lobe viewing angle is equal to a width of the light splitting structure in the row direction, and a shortest distance between boundaries of any two adjacent side lobe viewing angles is equal to the width of the light splitting structure in the row direction.

13. The display apparatus according to claim 12, wherein relative positions of all sub-pixels, in the one pixel island covered by the one light splitting repeating unit, to the corresponding light splitting structures in the one light splitting repeating unit are continuously arranged in the row direction.

14. The display apparatus according to claim 12, wherein in the row direction, a width of a light splitting structure is equal to 1/m of a width of a corresponding pixel island, wherein m is a total quantity of the light splitting structures in one of the light splitting repeating units.

15. The display apparatus according to claim 14 wherein in a direction perpendicular to the display panel, a perpendicular distance T between the pixel island and the light splitting structure satisfies the following formula:

$$0.95 * \frac{w}{2} * \mathrm{Cot}\frac{(m*N+k)*\Delta\theta}{2} \le T \le 1.05 * \frac{w}{2} * \mathrm{Cot}\frac{(m*N+k)*\Delta\theta}{2},$$

wherein w is a width of one of the light splitting structures in the row direction, $\Delta\theta$ is an angle of a viewpoint formed by light emitted by one of the sub-pixels passing the corresponding light splitting structure.

16. The display apparatus according to claim 15, wherein an angle of a gap between two adjacent viewpoints is $\Delta\theta$.

17. The display apparatus according to claim 15, wherein the light splitting structure is a cylindrical lens, and a focal length of the cylindrical lens is equal to T.

18. The display apparatus according to claim 17, further comprising: a spacer dielectric layer between the display panel and the light splitting structure.

19. The display apparatus according to claim 12, wherein every three of the pixel islands continuously arranged in the column direction are one pixel repeating unit; and
in one of pixel repeating units, sub-pixels of a same pixel island are same in display color, and sub-pixels of different pixel islands are different in the display color.

20. The display apparatus according to claim 12, wherein a pattern on an imaging surface formed by light emitted from the sub-pixels, in the one pixel island covered by the first light splitting structure, and passing through the first light splitting structure is complementary to a pattern on the imaging surface formed by light emitted from the sub-pixels, in the one pixel island covered by the second light splitting structure, and passing through the second light splitting structure.

* * * * *